United States Patent
Yamada

(10) Patent No.: US 9,122,445 B2
(45) Date of Patent: Sep. 1, 2015

(54) DISPLAY DEVICE, ELECTRONIC APPARATUS AND DISPLAY CONTROL METHOD WITH A THUMBNAIL DISPAY

(75) Inventor: Yusuke Yamada, Matsumoto (JP)

(73) Assignee: SEIKO EPSON CORPORATION, Tokyo (JP)

(*) Notice: Subject to any disclaimer, the term of this patent is extended or adjusted under 35 U.S.C. 154(b) by 129 days.

(21) Appl. No.: 13/468,384

(22) Filed: May 10, 2012

(65) Prior Publication Data
US 2012/0287165 A1 Nov. 15, 2012

(30) Foreign Application Priority Data
May 12, 2011 (JP) ................................. 2011-107428

(51) Int. Cl.
*G09G 5/32* (2006.01)
*G09G 5/10* (2006.01)
*G06F 3/147* (2006.01)
*G06F 3/0483* (2013.01)
*G09G 3/34* (2006.01)

(52) U.S. Cl.
CPC .............. *G06F 3/147* (2013.01); *G06F 3/0483* (2013.01); *G09G 3/344* (2013.01); *G09G 2310/04* (2013.01); *G09G 2340/04* (2013.01); *G09G 2340/14* (2013.01); *G09G 2380/14* (2013.01)

(58) Field of Classification Search
None
See application file for complete search history.

(56) References Cited

U.S. PATENT DOCUMENTS

| | | | |
|---|---|---|---|
| 6,466,237 B1* | 10/2002 | Miyao et al. .................. | 715/838 |
| 6,983,426 B1 | 1/2006 | Kobayashi et al. | |
| 2002/0191033 A1* | 12/2002 | Roberts ......................... | 345/853 |
| 2004/0233239 A1* | 11/2004 | Lahdesmaki ................. | 345/810 |
| 2006/0268100 A1* | 11/2006 | Karukka et al. ........... | 348/14.01 |
| 2007/0205978 A1 | 9/2007 | Zhou et al. | |
| 2007/0226652 A1 | 9/2007 | Kikuchi et al. | |
| 2008/0159708 A1* | 7/2008 | Kazama et al. ................. | 386/69 |
| 2009/0002335 A1* | 1/2009 | Chaudhri ...................... | 345/173 |
| 2010/0085310 A1* | 4/2010 | Becker .......................... | 345/172 |
| 2011/0001748 A1* | 1/2011 | Rutman et al. ................ | 345/214 |
| 2012/0216117 A1* | 8/2012 | Arriola et al. ................. | 715/716 |

FOREIGN PATENT DOCUMENTS

| | | | |
|---|---|---|---|
| JP | 2001-125913 A | 5/2001 |
| JP | 2006-313485 A | 11/2006 |
| JP | 2007-257336 A | 10/2007 |
| JP | 2007-532971 A | 11/2007 |
| JP | 2008-301502 A | 12/2008 |

* cited by examiner

*Primary Examiner* — Joni Richer
*Assistant Examiner* — Yi Wang
(74) *Attorney, Agent, or Firm* — Maschoff Brennan

(57) ABSTRACT

A display apparatus includes: a display device that displays a plurality of images in a first row, an operation of an application program being assigned to each of the images; a rearrangement device that rearranges the plurality of images, when a portion of the first row is specified, such that the specified portion is at an opened facing page section; an execution device that executes the operation of the application program corresponding to an image located at the opened facing page section when the opened facing page section is specified; and a display control device that controls the display device, when the operation is executed by the execution device, to perform a display according to the operation executed.

9 Claims, 23 Drawing Sheets

| Thumbnail ID | Application ID | Operation | Setting file |
|---|---|---|---|
| Word processor 1 | Word processor | Full screen display | |
| Search 1 | Search | Thumbnail display | Search setting |
| Clock 1 | Clock | Thumbnail display | Clock setting |
| Shopping 1 | Shopping | Thumbnail display | Shopping setting |
| Browser 1 | Browser | Full screen display | |
| Browser 2 | Browser | Thumbnail display | Browser 2 setting |

FIG. 16

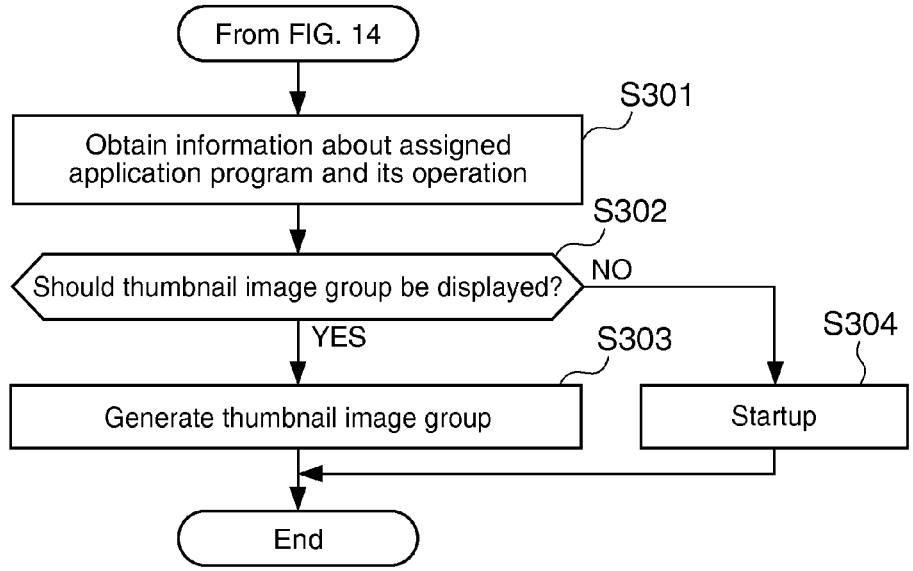

FIG. 17

| Search 1 | | | |
|---|---|---|---|
| Arrangement order | Thumbnail ID | Original image type | Related data |
| 1 | a1 | Static | aaa1 |
| 2 | a2 | Dynamic | Physics |
| 3 | a3 | Dynamic | Chemistry |
| ... | ... | ... | ... |

FIG. 18

DISPLAY DEVICE, ELECTRONIC APPARATUS AND DISPLAY CONTROL METHOD WITH A THUMBNAIL DISPAY

BACKGROUND

1. Technical Field

The present invention relates to display devices, electronic apparatuses and display control methods.

2. Related Art

Technologies of displaying a document composed of a plurality of pages are known. For example, Japanese Laid-open Patent Application 2006-313485 (Patent Document 1) and Japanese Laid-open Patent Application 2008-301502 (Patent Document 2) describe such technologies. According to Patent Document 1, an electronic book display device arranges thumbnails of five pages in a stepwise manner within a single screen. The electronic book display device displays one of the pages located in the center with a size larger than the size of the other pages. Also, when the electronic book display device displays, for example, the first page through the fifth page, with the third page being displayed in the center, and when the upward instruction key is operated, the thumbnails are upwardly scrolled by one step, the first page being displayed is erased, and the sixth page is newly displayed. An image processing device described in Patent Document 2 displays thumbnail images of pages in a matrix configuration within a screen. When the entire pages cannot be displayed within the screen, the screen is scrolled to display thumbnails of those of the pages that could not be displayed. When the user designates one of the pages from among a list of pages, only the designated page is enlarged and displayed.

According to the technologies described in Patent Documents 1 and 2, it is not possible to display a specified page, among a plurality of images, each being assigned with an operation of an application program, in a manner to be located at an opened facing page section.

SUMMARY

In accordance with some aspects of the invention, there is provided a technology for displaying a specified page, among a plurality of images, each of which is assigned with an operation of an application program, in a manner to be located at an opened facing page section.

In accordance with an aspect of a preferred embodiment of the invention, a display apparatus includes a display device that displays a plurality of images in a first row, each of the images being assigned with an operation of an application program, a rearrangement device that rearranges the plurality of images, when a portion of the first row is specified, such that the specified portion is at an opened facing page section, an execution device that executes the operation of the application program corresponding to an image located at the opened facing page section when the opened facing page section is specified, and a display control device that controls the display device, when the operation is executed by the execution device, so as to perform a display according to the operation executed. According to the display apparatus described above, a specified image, among a plurality of images to which an operation of an application program is assigned, can be displayed in a manner to be located at an opened facing page section.

In accordance with another aspect of the preferred embodiment, the operation of the application program may be an operation of newly displaying a plurality of images to which an operation of an application program is assigned in a second row different from the first row. According to this display apparatus, when an image is specified, a plurality of images can be displayed in the second row.

In accordance with still another aspect of the preferred embodiment, when a portion among the second row is specified, the display control device may display a plurality of images, each of the images being assigned with an operation of an application program, in a third row in a predetermined direction with respect to the first row as viewed from the second row. According to this display apparatus, when an image in the second row is specified, a plurality of images can be displayed in the third row.

In accordance with yet another aspect of the preferred embodiment, each of the plurality of images to be displayed according to the operation executed may correspond to an application program or contents. According to this display apparatus, a plurality of images each corresponding to the application program or contents can be displayed.

In accordance with another aspect of the preferred embodiment, the display device may have a plurality of pixels, wherein the gray level of the plurality of pixels is changed by a write operation of applying a voltage to each of the pixels a plurality of times, the display control device compares image data indicative of an image to be newly displayed at the display device with scheduled image data indicative of an image scheduled to be displayed at the display device by the write operation in progress to thereby judge as to which pixels among the plurality of pixels are to change the gray level. When pixels that are judged to be those of the pixels whose gray level is to be changed are not in the write operation, the display control device may start the write operation on the pixels to have a gray level specified by the image data. When pixels that are judged to be those of the pixels whose gray level is to be changed are in the write operation, the display control device may start the write operation on the pixels to have a gray level specified by the image data upon completion of the write operation in progress. According to this display apparatus, the display speed visually perceived by the user can be improved.

In accordance with another embodiment of the invention, an electronic apparatus having any one of the display apparatuses described above is provided. According to the electronic apparatus, a specified image, among a plurality of images to which an operation of an application program is assigned, can be displayed in a manner to be located at an opened facing page section.

Furthermore, in accordance with another embodiment of the invention, a display control method includes the steps of: displaying a plurality of images, each of the images being assigned with an operation of an application program, in a first row at a display device; rearranging the plurality of images, when a portion of the first row is specified, such that the specified portion is at an opened facing page section; executing the operation of the application program corresponding to an image located at the opened facing page section when the opened facing page section is specified; and controlling the display device, when the operation is executed, so as to perform a display according to the operation executed. According to the display control method described above, a specified image, among a plurality of images to which an operation of an application program is assigned, can be displayed in a manner to be located at an opened facing page section.

BRIEF DESCRIPTION OF THE DRAWINGS

FIG. 16 is a table showing an example of data indicative of corresponding relation between application programs and operations.

FIG. 17 is a flow chart showing an operation performed when a thumbnail image at an opened facing page section is selected.

FIG. 18 is a table showing an example of setting files for displaying thumbnails.

DESCRIPTION OF EXEMPLARY EMBODIMENTS

1. Configuration

Figure 1:
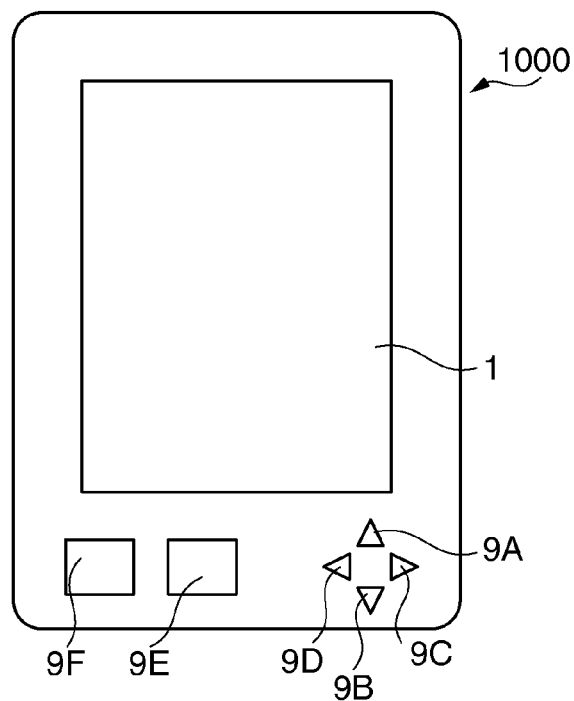
FIG. 1 is a view of an external appearance of an electronic apparatus 1000 in accordance with an embodiment of the invention.

FIG. 1 is a view showing the external appearance of an electronic apparatus 1000 in accordance with an embodiment. The electronic apparatus 1000 is a display device that displays images. In this example, the electronic apparatus 1000 is a device for reading electronic books (an example of documents), in other words, an electronic book reader. The electronic book is composed of data including images of multiple pages. The electronic apparatus 1000 displays the electronic book in a predetermined unit (for example, in the unit of one page) in a display section 1. Among the multiple pages included in the electronic book, one page that is subject to being displayed is referred to as a "selected page." The selected page may be changed in response to operation of buttons 9A-9F by the user. In other words, the user can turn pages of the electronic book (turning pages forward or turning pages backward) by operating the buttons 9A-9F. Also, the electronic apparatus 1000 has the function of executing application programs, in addition to reading electronic books.

Figure 2:
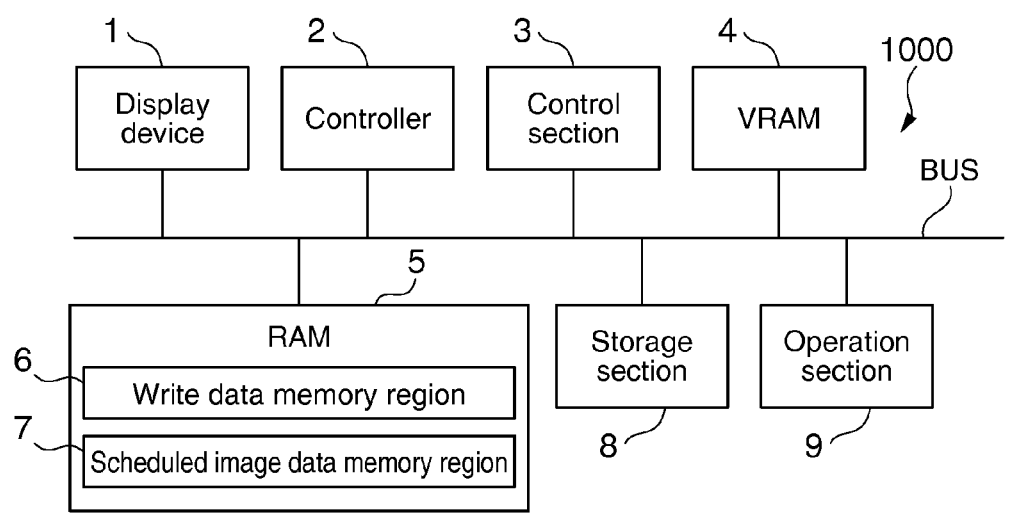
FIG. 2 is a block diagram of a hardware configuration of the electronic apparatus 1000.

FIG. 2 is a block diagram showing a hardware configuration of the electronic apparatus 1000. The electronic apparatus 1000 includes a display section 1, a controller 2, a control section 3, a VRAM (Video Random Access Memory) 4, a RAM (Random Access Memory) 5, a storage section 8, an operation section 9, and a bus BUS. The display section 1 has a display panel including display elements for displaying an image. In this example, the display elements include display elements using electrophoretic particles, as display elements having the memory-property that retains a display state without supplying energy through voltage application or the like. The display section 1 displays an image in monochrome multiple gray levels (in this example, two gray levels of black and white) with the display elements. The controller 2 controls the display section 1. The control section 3 is a device that controls each of the sections of the electronic apparatus 1000, such as, a microcomputer having a CPU (Central Processing Unit), a ROM (Read Only Memory) and a RAM. The CPU uses the RAM as a work area, and executes a program stored in the ROM or the storage section 8. The ROM stores, for example, an OS (Operating System) program for controlling fundamental operations of the electronic apparatus 1000. The VRAM 4 is a memory that stores image data indicative of an image to be displayed on the display section 1. The RAM 5 is a memory that stores data. In this example, the RAM 5 includes a write data memory region 6 that stores write data, and a scheduled image data memory region 7 that stores scheduled image data. The write data and the scheduled image data will be discussed later in detail. The storage section 8 is a nonvolatile memory that stores various data and application programs, in addition to data of electronic books (book data). The storage section 8 is capable of storing data of a plurality of electronic books. The operation section 9 is an input device for inputting user's instructions, and includes, for example, a touch screen, key pads, buttons or the like. The buttons 9A-9F shown in FIG. 1 are one of concrete examples of the operation section 9. The bus BUS is a transmission path for transmitting data or signals between the components.

Figure 3:
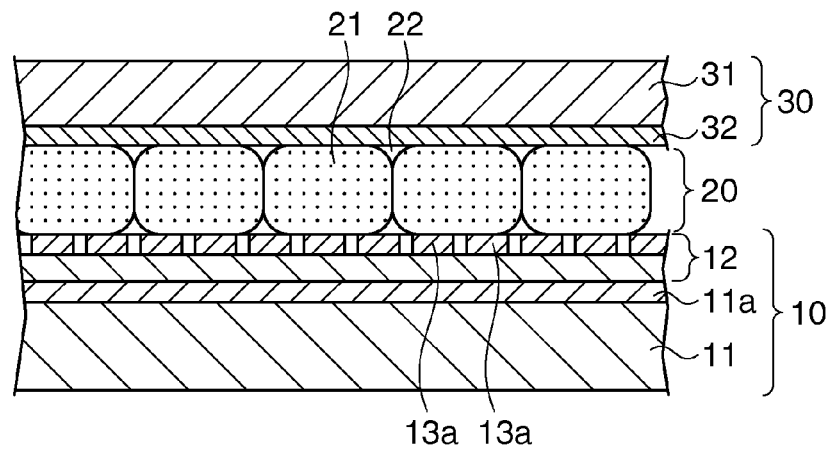
FIG. 3 is a schematic view of a cross-sectional structure of a display section 1.

FIG. 3 is a schematic view of a cross-sectional structure of the display section 1. The display section 1 includes a first substrate 10, an electrophoretic layer 20, and a second substrate 30. The first substrate 10 and the second substrate 30 are substrates for retaining the electrophoretic layer 20.

The first substrate 10 includes a substrate 11, a bonding layer 11a and a circuit layer 12. The substrate 11 is made of a material having dielectric property and flexibility, for example, a polycarbonate substrate. It is noted that the substrate 11 may be made of any resin material that is lightweight, flexible, elastic and dielectric, without any particular limitation to polycarbonate. As another example, the substrate 11 may be formed from glass material without flexibility. The bonding layer 11a is a layer that bonds the substrate 11 and the circuit layer 12 together. The circuit layer 12 is a layer having a circuit for driving the electrophoretic layer 20. The circuit layer 12 has pixel electrodes 13a.

The electrophoretic layer 20 includes a binder 22 and microcapsules 21. The microcapsules 21 are fixed by the binder 22. The binder 22 may be made of any material that has good affinity with the microcapsules 21, excellent adhesion to the electrodes, and dielectric property. Each of the microcapsules 21 is a capsule containing a dispersion medium and electrophoretic particles. The microcapsules 21 may preferably be composed of a material having flexibility, such as, composites of gum arabic and gelatin, urethane compounds, and the like. It is noted that an adhesive layer made of adhesive may be provided between the microcapsules 21 and the pixel electrodes 13a.

As the dispersion medium, it is possible to use any one of materials including water; alcohol solvents (such as, methanol, ethanol, isopropanol, butanol, octanol, and methyl cellosolve); esters (such as, ethyl acetate and butyl acetate); ketones (such as, acetone, methyl ethyl ketone, and methyl isobutyl ketone); aliphatic hydrocarbons (such as, pentane, hexane, and octane); alicyclic hydrocarbons (such as, cyclohexane and methylcyclohexane); aromatic hydrocarbons (such as, benzene, toluene, long-chain alkyl group-containing benzenes (such as, xylenes, hexylbenzene, heptylbenzene, octylbenzene, nonylbenzene, decylbenzene, undecylbenzene, dodecylbenzene, tridecylbenzene, and tetradecylbenzene)); halogenated hydrocarbons (such as, methylene chloride, chloroform, carbon tetrachloride, and 1,2-dichloroethane); and carboxylates. Also, the dispersion medium may be made of any one of other various oils. The dispersion medium may use any of the materials described above in combination, and may be further mixed with a surfactant.

The electrophoretic particles are particles (polymer or colloid) having a property in which the particles move in the dispersion medium by electric fields. In the present embodiment, white electrophoretic particles and black electrophoretic particles are contained in each of the microcapsules 21. The black electrophoretic particles are particles including black pigments, such as, for example, aniline black, carbon black and the like, and are positively charged in the present embodiment. The white electrophoretic particles are particles including white pigment, such as, for example, titanium dioxide, aluminum oxide and the like, and are negatively charged in the present embodiment.

The second substrate 30 includes a film 31 and a transparent electrode layer 32. The film 31 seals and protects the electrophoretic layer 20. The film 31 may be formed from a material that is transparent and has a dielectric property, such as, for example, polyethylene terephthalate. The transparent electrode 32 is made of a transparent conductive material, such as, for example, indium tin oxide (ITO).

Figure 4:
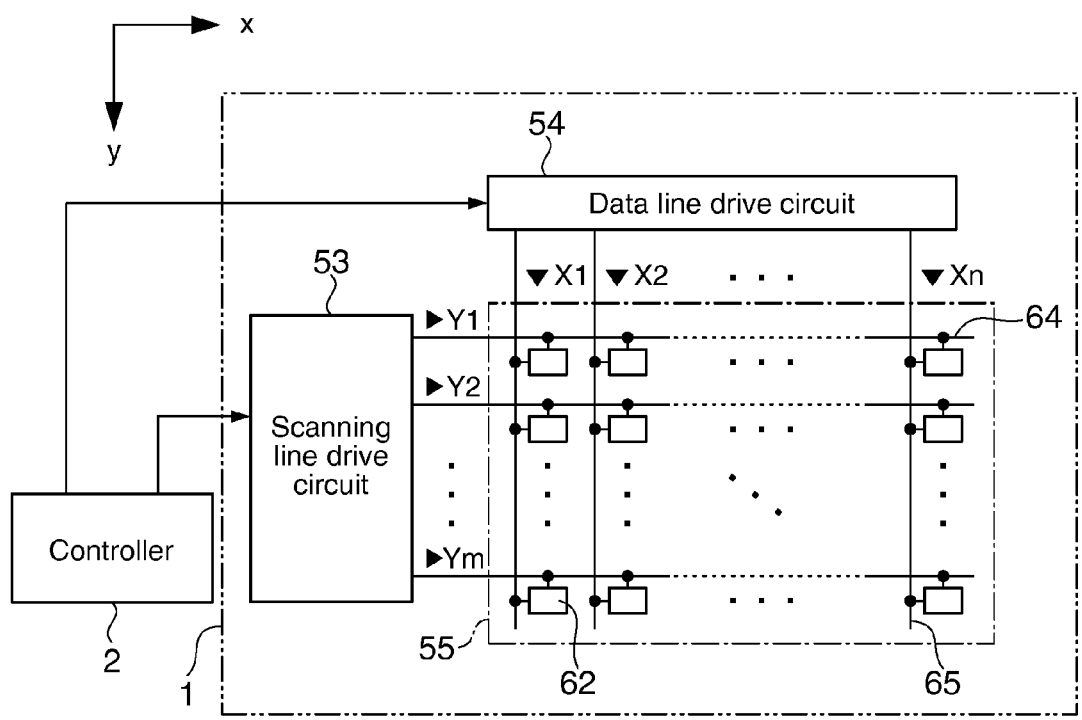
FIG. 4 is a schematic circuit diagram of the display section.

FIG. 4 is a diagram showing a circuit configuration of the display section 1. The display section 1 includes m scanning lines 64, n data lines 65, m×n pixels 62, a scanning line drive circuit 53, and a data line drive circuit 54. The scanning line drive circuit 53 and the data line drive circuit 54 are controlled by the controller 2. The scanning lines 64 are arranged along a row direction (x direction), and transmit a scanning signal. The scanning signal is a signal that sequentially, exclusively selects one scanning line 64 from among the m scanning lines 64. The data lines 65 are arranged along a column direction (y direction), and transmit data signals. The data signals are signals indicative of gray levels of each pixel. The scanning lines 64 are insulated from the data lines 65. The pixels 62 are provided at positions corresponding to intersections between the scanning lines 64 and the data lines 65, and exhibit gray levels according to the respective data signals. It is noted that, when one scanning line 64 among the plurality of scanning lines 64 needs to be distinguished from the others, it is called the scanning line 64 in the first row, the second row, . . . , or the $m^{-th}$ row. The data lines 65 may be similarly distinguished. The m×n pixels 62 form a display region.

Figure 5:
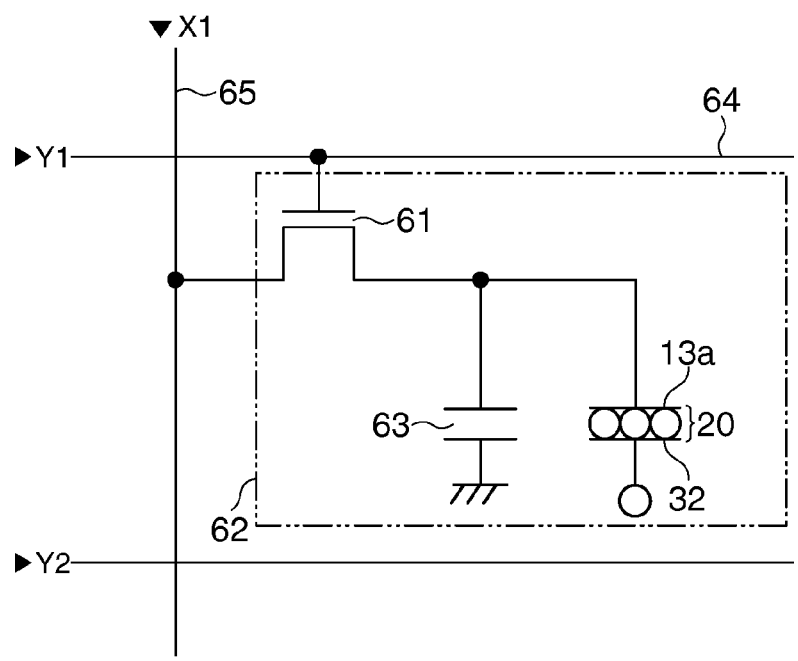
FIG. 5 is a diagram of an equivalent circuit of a pixel 62.

FIG. 5 is a diagram showing an equivalent circuit of the pixel 62. The pixel 62 includes a transistor 61, a retention capacitance 63, a pixel electrode 13a, an electrophoretic layer 20, and a transparent electrode 32. The transistor 61 is a switching element for controlling data writing to the pixel electrode 13a, for example, an n-channel TFT (Thin Film Transistor). The transistor 61 includes a gate, a source and a drain, connected to the scanning line 64, the data line 65 and the pixel electrode 13a, respectively. When a scanning signal at L (Low) level (non-selection signal) is inputted in the gate, the source and the drain of the transistor 61 are insulated from each other. When a scanning signal at H (High) level (selection signal) is inputted in the gate, the source and the drain of the transistor 61 become conductive to each other, and a data voltage (a voltage indicative of the data signal) is written to the pixel electrode 13a. Also, the drain of the transistor 61 connects to the retention capacitance 63. The retention capacitance 63 retains a charge according to the data voltage. The pixel electrode 13a is provided at each of the pixels 62, and disposed opposite the transparent electrode 32. The transparent electrode 32 is commonly shared by the entire pixels 62, and is given a potential Vcom. The electrophoretic layer 20 is held between the pixel electrode 13a and the transparent electrode 32. A voltage corresponding to a potential difference between the pixel electrode 13a and the transparent electrode 32 is applied to the electrophoretic layer 20. In the microcapsules 21, the electrophoretic particles move according to a voltage applied to the electrophoretic layer 20, thereby expressing a gray level. For example, when the potential on the pixel electrodes 13a is positive (for example, +15V) with respect to the potential Vcom on the transparent electrode 32, the negatively charged white electrophoretic particles move toward the pixel electrode 13a, and the positively charged black electrophoretic particles move toward the transparent electrode layer 32. As the display section 1 is viewed from the side of the second substrate 30, the pixels appear in black. When the potential on the pixel electrodes 13a is negative (for example, −15V) with respect to the potential Vcom on the transparent electrode layer 32, the positively charged black electrophoretic particles move toward the pixel electrodes 13a, and the negatively charged white electrophoretic particles move toward the transparent electrode layer 32. In this instance, the pixels appear in white.

In the following description, a period starting from the selection of the scanning line in the 1$^{st}$ row by the scanning line drive circuit 53 until the completion of the selection of the scanning line in the m-$^{th}$ row is referred to as a "frame period" or, simply a "frame." Each of the scanning lines 64 is selected once in each frame, and a data signal is supplied to each of the pixels 62 once in each frame.

Figure 6:
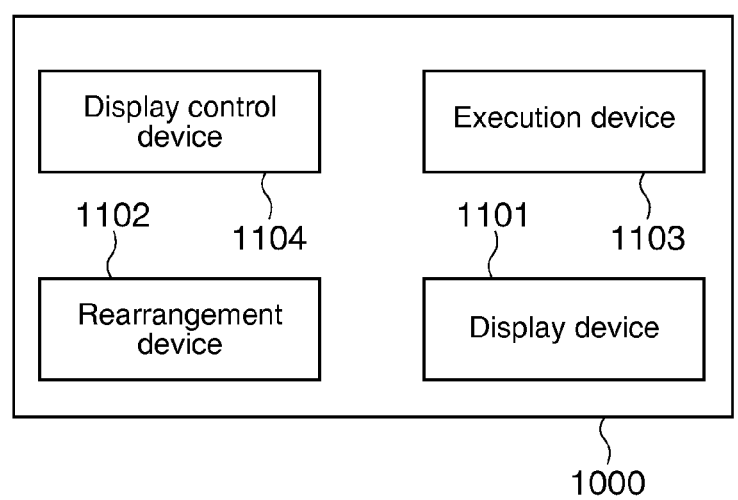
FIG. 6 is a block diagram of a functional configuration of the electronic apparatus 1000.

FIG. 6 is a block diagram showing a functional configuration of the electronic apparatus 1000. The electronic apparatus 1000 includes a display device 1101, a rearrangement device 1102, an execution device 1103, and a display control device 1104. The display device 1101 displays a plurality of images (thumbnail images), each of the images being assigned with an operation of an application program, in a first row. The rearrangement device 1102 rearranges the plurality of images, when a portion of the first row is specified (selected), such that the specified portion is at an opened facing page section. The execution device 1103 executes the operation of the application program corresponding to an image located at the opened facing page section when the opened facing page section is specified. The display control device 1104 controls the display device 1101, when the operation is executed by the execution device 1103, so as to perform a display according to the operation executed. In accordance with the present embodiment, the functions described above may be provided by an OS program. The control section 3 that executes the OS program is an example of the rearrangement device 1102 and the execution device 1103. The control section 3 and the controller 2 that execute the OS program may be an example of the display control device 1104. The display section 1 may be an example of the display device 1101.

2. Operation

Figure 7:
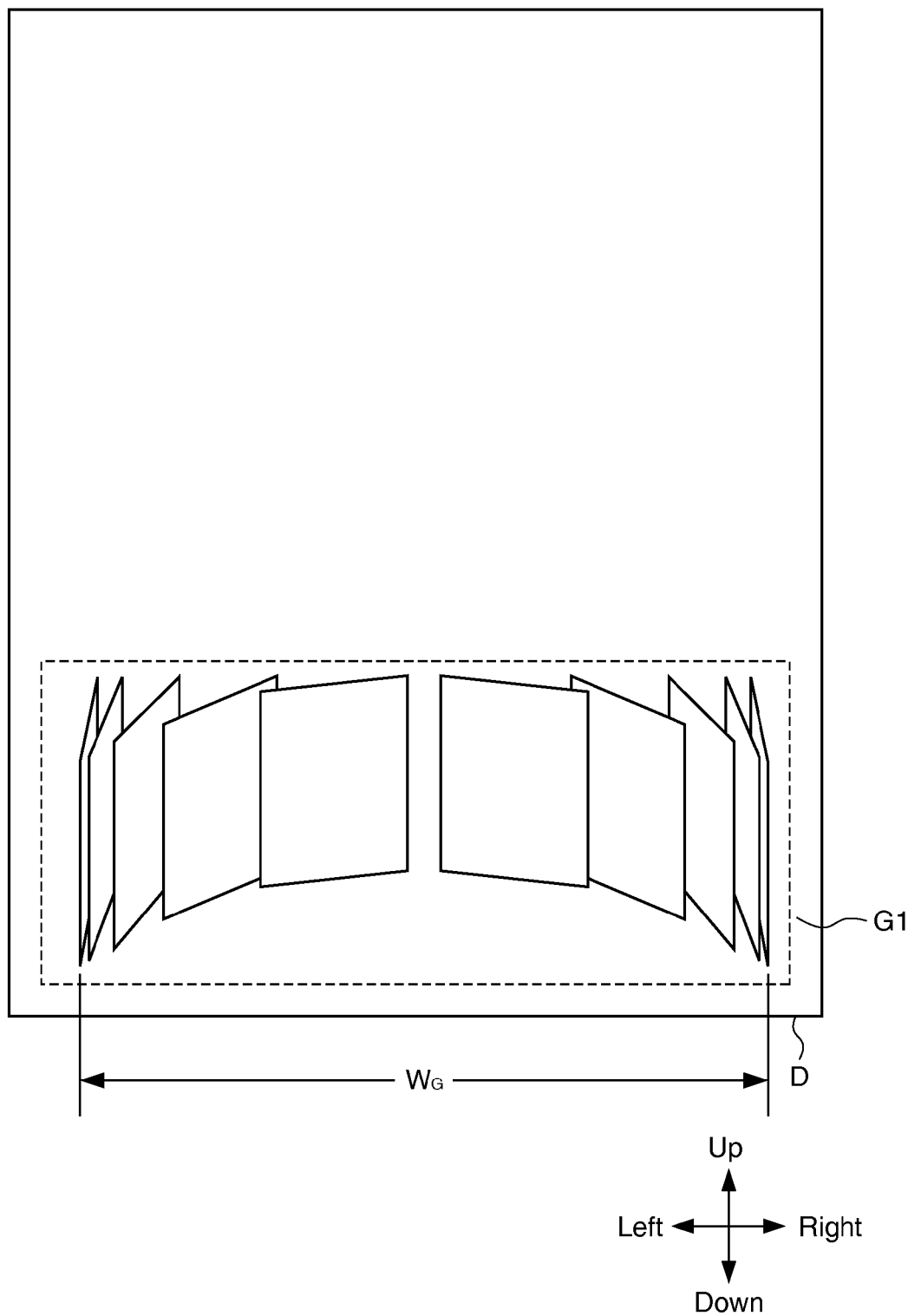
FIG. 7 is a view showing an example of a menu screen displayed at the electronic apparatus 1000.

FIG. 7 is a view exemplifying a menu screen (a desktop screen) displayed on the electronic apparatus 1000. The electronic apparatus 1000 has the function to display the menu screen, and start up an application program designated on the menu screen. The menu screen includes a thumbnail image group G1 (a plurality of thumbnail images) arranged in a row. The application program and its operation are assigned to each of the plural thumbnail images. The "thumbnail image" is an image having a size that occupies a portion of the display region D, and an image in which an original image is reduced (or enlarged) in size. The original image is, for example, an icon of the application program, or an operation screen of the application program. In this example, the thumbnail image group G1 is arranged along a bottom side of the display region D in a lower section of the display region D. It is noted that, in the following description, the longitudinal direction of the display region D may be referred to as a vertical direction and the transverse direction may be referred to as a horizontal direction.

2-1. Display of Menu Screen

Figures 8, 9:
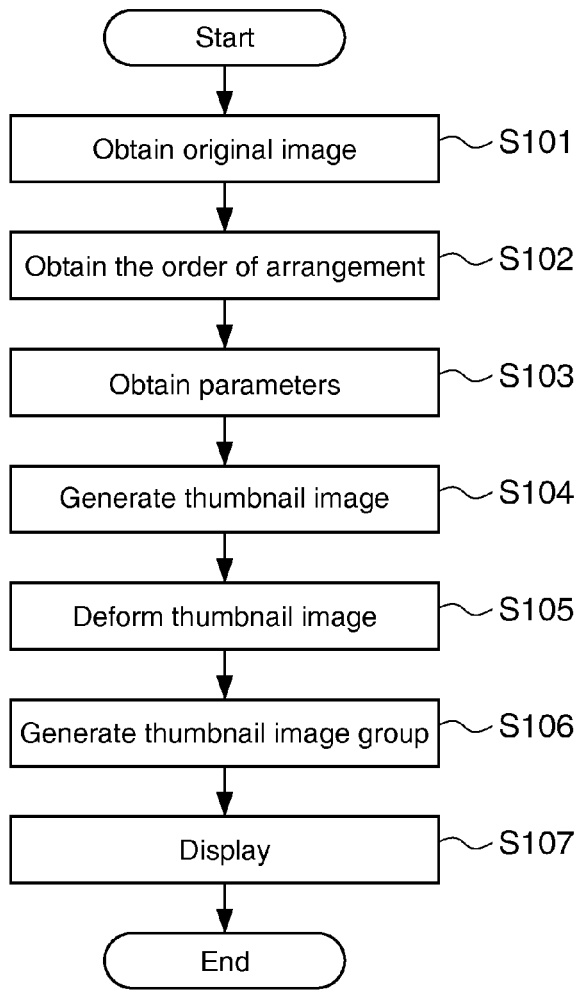
FIG. 8 is a flow chart showing a display process of displaying the menu screen.
FIG. 9 is a table showing an example of data indicative of thumbnail images.

FIG. 8 is a flow chart showing a process of displaying the menu screen. The process flow shown in FIG. 8 is started with a predetermined event as a trigger, for example, when the electronic apparatus 1000 is powered on, or display of the menu screen is instructed at the electronic apparatus 1000.

In step S101, the control section 3 obtains original images for a plurality of thumbnail images included in the thumbnail image group G1 in this example. The plural original images are stored in the storage section 8. In step S102, the control section 3 obtains data indicative of an arrangement order of the plural thumbnail images. The data includes identifiers of the thumbnail images, and numbers indicative of the arrangement order.

FIG. 9 is a table showing an example of data indicative of the thumbnail images included in the thumbnail image group G1. The data includes numbers indicative of the arrangement order of the thumbnail images, and file names as the identifiers of the thumbnail images. The data indicates that the thumbnail image group G1 includes ten thumbnail images. Further, the data indicates that one of the ten thumbnail images with the file name "aaa" is the first thumbnail image in the order, and one with the file name "jjj" is the last thumbnail image. This data is stored in the storage section 8. In step S101, the control section 3 reads out the data from the storage section 8, and obtains the original images having the file names included in the data from the storage section 8. In step S102, the control section obtains the order of arrangement of the thumbnail images from the data.

Referring back to FIG. 8, in step S103, the control section 3 obtains parameters to be used for displaying the thumbnail image group G1. These parameters are stored, together with the identifiers of the thumbnail images, in the storage section 8. The parameters obtained here include the number of images NS, the selected image SS, and the width WG. The number of images NS is a parameter indicative of the number of the thumbnail images included in the thumbnail image group G1. The selected image SS is a parameter that specifies a selected one of the thumbnail images included in the thumbnail image group G1. The width WG is a parameter indicative of the width of the thumbnail image group G1 (the length along the bottom edge of the display region).

In step S104, the control section generates thumbnail images. More specifically, the control section 3 reduces or expands the original images obtained in step S101, thereby generating the thumbnail images. In this example, the original images are enlarged or reduced in size to have a predetermined width value after reduction or enlargement. The control section 3 stores the generated thumbnail images in the RAM 5. In step S105, the control section 3 deforms the thumbnail images.

Figure 10A:
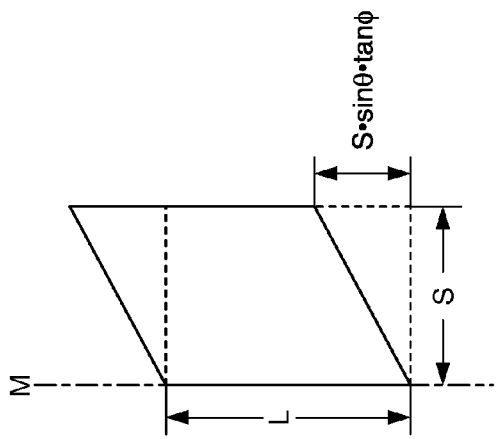
FIGS. 10A-10E are views for describing a thumbnail image deforming process.

FIGS. 10A-10E are views for describing a thumbnail image deforming process. Each of the thumbnail images generated in step S104 is an image of an original image seen in a plan view. This state is hereunder referred to as a "reference state." The shape of the thumbnail image will be changed, from the reference state, to a state being in a bird's eye view looking down from a certain viewpoint and being rotated about a certain rotation axis. FIG. 10A is a view showing an example of a thumbnail image after deformation. The thumbnail image after deformation is created by erecting an original image upright on a horizontal plane N within a virtual space, and rotating the image about a virtual rotation axis M (a left side of the thumbnail image before deformation, in this example) as a center through an angle of rotation θ from the reference state. The angle of the horizontal plane N (a deviation of an oval shown by a broken line in the figure from a precise circle) depends on an angle of depression φ with respect to the thumbnail image as viewed from a viewpoint above the upper side of the thumbnail image within the virtual space. For example, when the thumbnail image is viewed directly above the upper side, the oval indicated by a broken line becomes a precise circle. As the viewpoint lowers from there, the oval gradually becomes flatter.

Figure 10B:
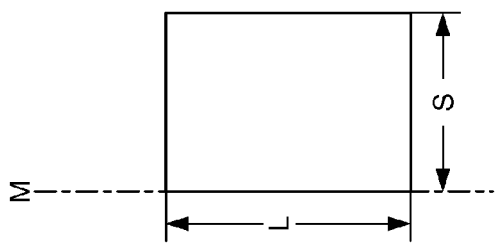
Figure 10C:
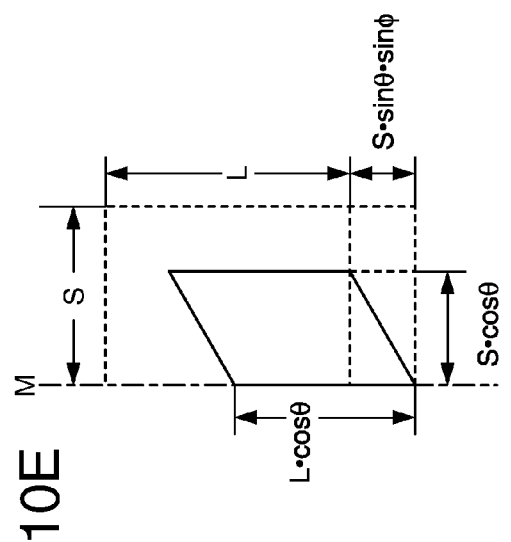
Figure 10D:
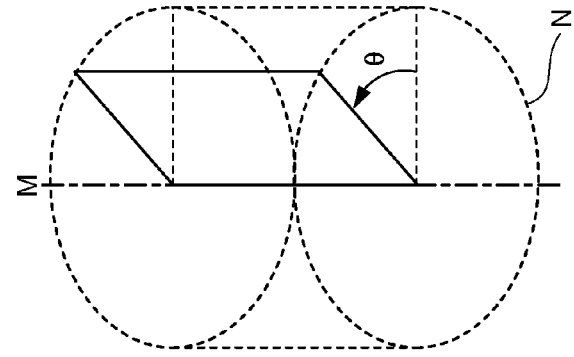
Figure 10E:
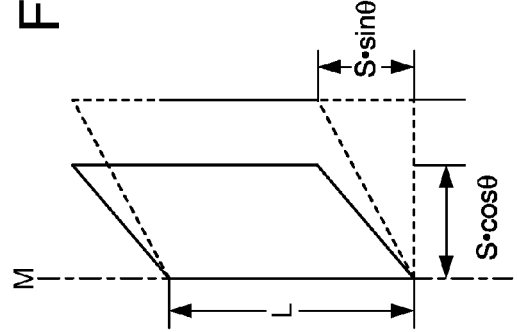

Deformation of the thumbnail image is conducted, for example, as follows. FIG. 10B is a view showing a thumbnail image in the reference state. The thumbnail image in the reference state is in a rectangular shape having a length L in the vertical direction and a length S in the horizontal direction. The thumbnail image in the reference state has a side in the vertical direction that is in parallel with the vertical direction of the display region, and a side in the horizontal direction that is in parallel with the horizontal direction of the display region. The control section 3 adds to the thumbnail image in the reference state a deformation in the vertical direction while maintaining the width in the horizontal direction, thereby shifting the right side by S·sin θ·tan φ with respect to the left side (FIG. 10C)). Then, the control section 3 reduces the thumbnail image in the horizontal direction by a scaling factor of cos θ (FIG. 10D). Finally, the control section 3 reduces the thumbnail image in the vertical direction by a scaling factor of cos θ (FIG. 10E). The thumbnail image after deformation is in a parallelogram with the height being L·cos θ, and the width being S·cos θ, and the right side and the left side thereof are mutually shifted by S·sin θ·sin φ.

In this example, the deformation of the thumbnail images may be characterized by two parameters, the angle of rotation θ and the angle of depression φ. To simplify the description, a case in which the angle of rotation θ and the angle of depression φ are constant will be described as an example.

Referring back to FIG. 8, in step S106, the control section 3 generates a thumbnail image group G1. The thumbnail image group G1 is an image in which plural images are combined. In the thumbnail image group G1, the plurality of thumbnail images include at least two thumbnail images partially overlapped each other. In this example, the plural thumbnail images are disposed in a manner that their top ends are in contact with a single horizontal linear line. The plural thumbnail images are arranged, according to the order indicated by the data obtained in step S102, in a manner that, for example, the first image is disposed at the left end and the last image is disposed at the right end. Here, the interval (distance) between the i-$^{th}$ thumbnail image and the (i+1)-$^{th}$ thumbnail image is expressed as d (i). For example, d (SS1) expresses the interval between a selected thumbnail image and the next thumbnail image in the order.

Figure 11:
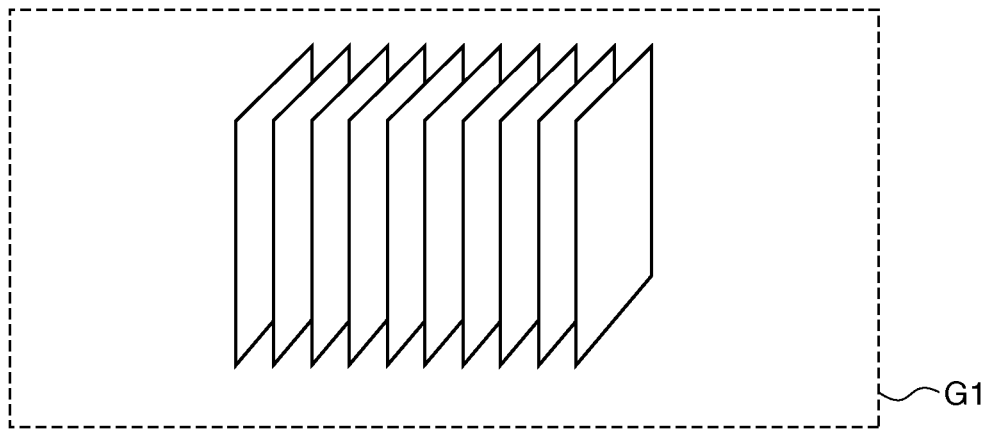
FIG. 11 is a view showing an example of a thumbnail image group G1 in a reference state.

FIG. 11 is a view showing an example of the thumbnail image group G1 in the reference state. FIG. 11 shows an example in which the thumbnail image group G1 includes ten thumbnail images. In the reference state, these ten thumbnail images will be deformed, using common parameters (for example, the width w, the angle of rotation θ and the angle of depression φ). Also, parameters (for example, the interval d) to be used when the plural thumbnail images are overlapped one another are constant. The reference state may correspond, for example, to a menu screen that is displayed when the electronic apparatus 1000 is newly started up.

Figure 12:
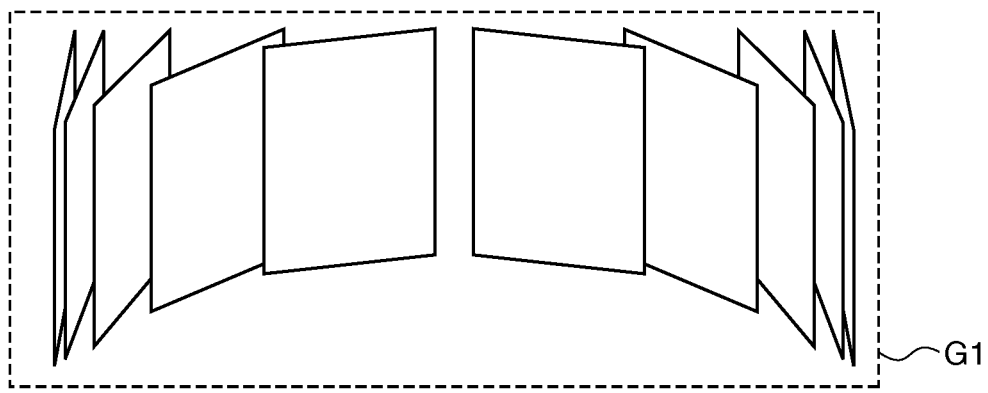
FIG. 12 is a view showing an example of the thumbnail image group G1 that has been modified from the reference state.

FIG. 12 is a view showing an example of the thumbnail image group G1 that has been modified from the reference state. In this example, a state in which the fifth thumbnail image is selected is shown. The angle of rotation θ (i) and the interval d (i) of the i-$^{th}$ thumbnail image is decided according to the positional relation with the selected thumbnail image. In this example, the angle of rotation θ (i) satisfies the following conditions.

(1) In the range of 1≤i≤SS1, the absolute value of θ (i) is the smallest at the selected thumbnail image (in other words, where i=SS1.)

(2) In the range of 1≤i≤SS1, the farther from the selected thumbnail image, the greater the absolute value of θ (i) becomes. In other words, θ (i−1)≤θ (i).

(3) The sign of θ (i) in the range of (SS1+1)≤i≤NS is opposite to the sign of θ (i) in the range of 1≤i≤SS1. It is noted that NS is the number of thumbnail images included in the thumbnail image group G1. The sign of θ (i) is defined by FIG. 10A.

(4) In the range of (SS1+1)≤i≤NS, the absolute value of θ (i) is the smallest at a thumbnail image next to the selected thumbnail image (in other words, where i=SS1+1.)

(5) In the range of (SS1+1)≤i≤NS, the farther from the thumbnail image next to the selected thumbnail image, the greater the absolute value of θ (i) becomes. In other words, θ (i)≤θ(i+1).

Also, in this example, the interval d (i) satisfies the following conditions.

(1) In a certain range with the selected thumbnail image as a reference, the interval between the selected thumbnail image and the next thumbnail image is largest. For example, when the selected thumbnail image and its preceding k thumbnail images and the next thumbnail image to the selected thumbnail image and its succeeding k thumbnail images are in this range, d (SS1) is the largest in the range of (SS1−k+1)≤i≤(SS1+k).

(2) In the range of (1), the interval d (i) becomes narrower (or equal) as thumbnail images are placed farther from the selected page. In other words, in the range of (SS1−k+1)≤i≤SS1, d (SS1)≤d (i) is established, and in the range of (SS1+1)≤i≤(SS1+k), d (i+1)≤d (i) is established.

(3) When the range of (1) is exceeded, the interval d (i) becomes constant. More specifically, in the range of i<(SS1−k+1) and in the range of (SS1+k)<i, d (i) is constant.

(4) The interval outside the boundary of the range of (1) is less than the interval within the boundary. More specifically, d (SS1−k)≤d (SS1−k+1) is established, and d (SS1+k)≤d (SS1+k+1) is established.

When two thumbnail images are overlapped each other, the following conditions are satisfied.

(1) The selected thumbnail image and its preceding thumbnail images are arranged in a manner that thumbnail images of higher order numbers are superposed over those of lower order numbers. For example, in the range of 1≤i≤SS1, the (i+1)-$^{th}$ thumbnail image is superposed over the i-$^{th}$ thumbnail image.

(2) The thumbnail image next to the selected thumbnail image and its succeeding thumbnail images are arranged in a manner that thumbnail images of lower order numbers are superposed over those of higher order numbers. For example, in the range of (SS1+1)≤i≤NS, the i-$^{th}$ thumbnail image is superposed over the (i+1)-$^{th}$ thumbnail image.

According to the conditions (1)-(5) about the angle of rotation θ (i), the conditions (1)-(4) about the interval d (i), and the conditions (1)-(2) about overlapping, an opened facing page section is formed in the thumbnail image group G1. The opened facing page section refers to two thumbnail images that are displayed with the topmost layer, the smallest angle of rotation, and the largest interval, in the thumbnail image group G1. In the example shown in FIG. 12, the selected thumbnail image (the fifth thumbnail image) and the next thumbnail image in the order (the sixth thumbnail image) form the opened facing page section.

Referring back to FIG. 8, in step S107, the control section 3 displays the created thumbnail image group G1 in the menu screen. The position of the thumbnail image group G1 to be displayed (more specifically, the position of a representative point of the thumbnail image group G1) is decided in advance. The representative point of the thumbnail image group G1 is, for example, the left upper apex of a circumscribed rectangle (having sides in parallel with the sides of the display region) of the thumbnail image group G1. In this manner, the menu screen shown in FIG. 7 is displayed.

2-2. Operation at Menu Screen Example 1

Figure 13A:
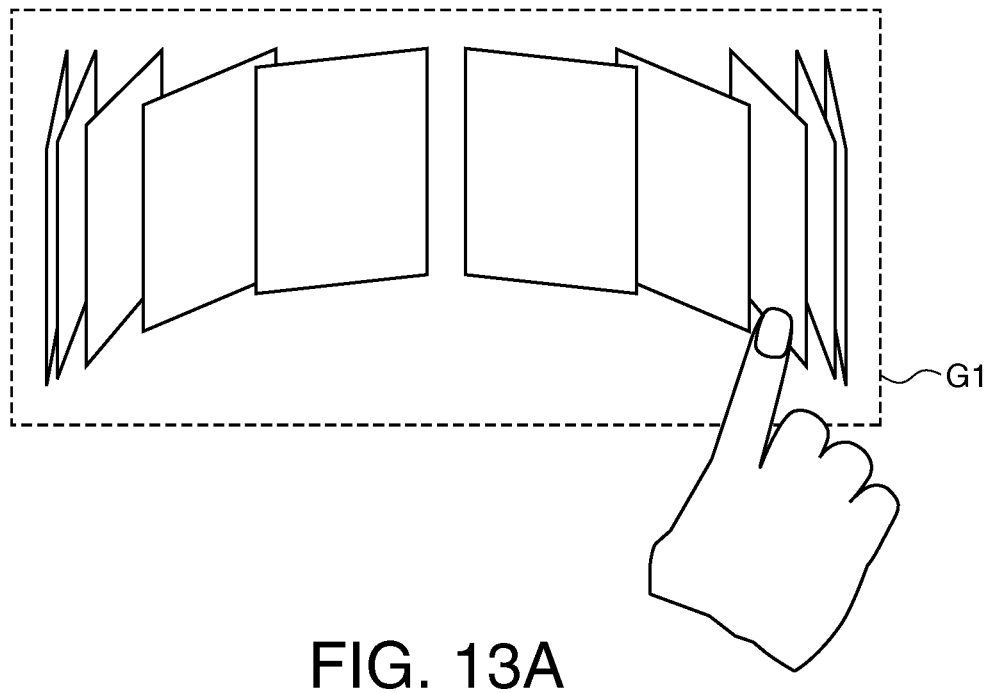
FIGS. 13A and 13B are views for describing an exemplary operation at the menu screen.
Figure 13B:
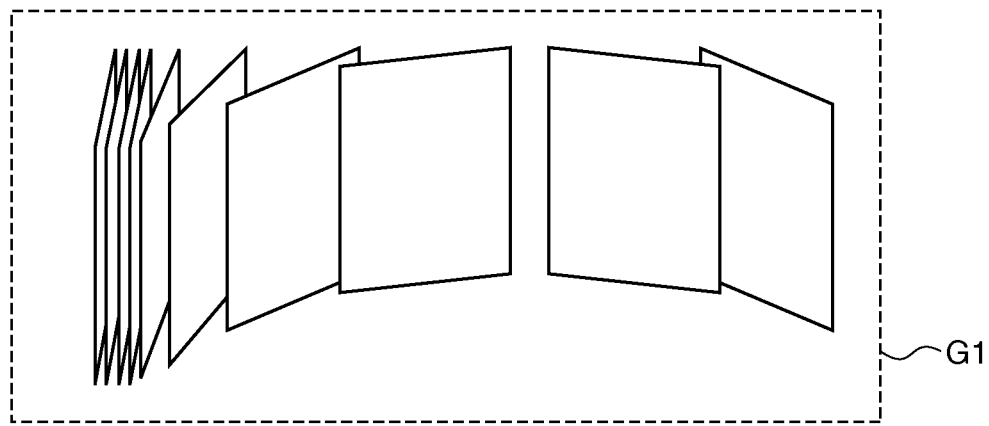

FIGS. 13A and 13B are views for describing an example of operations at the menu screen. FIGS. 13A and 13B show an operation example when another thumbnail image different from the selected thumbnail image is newly selected in the thumbnail image group G1. FIG. 13A shows a menu screen before the other thumbnail image is selected, and FIG. 13B shows a menu screen after the other thumbnail image has been selected. The selection of a thumbnail image is performed through the operation section 9. When the operation section 9 includes a touch screen, a portion on the touch screen corresponding to the thumbnail image is touched by the user, whereby the thumbnail image is selected. In this example, when a thumbnail image other than the selected thumbnail image is newly selected, the thumbnail image group G1 is modified such that the newly selected thumbnail image is located at the opened facing page section.

Figure 14:
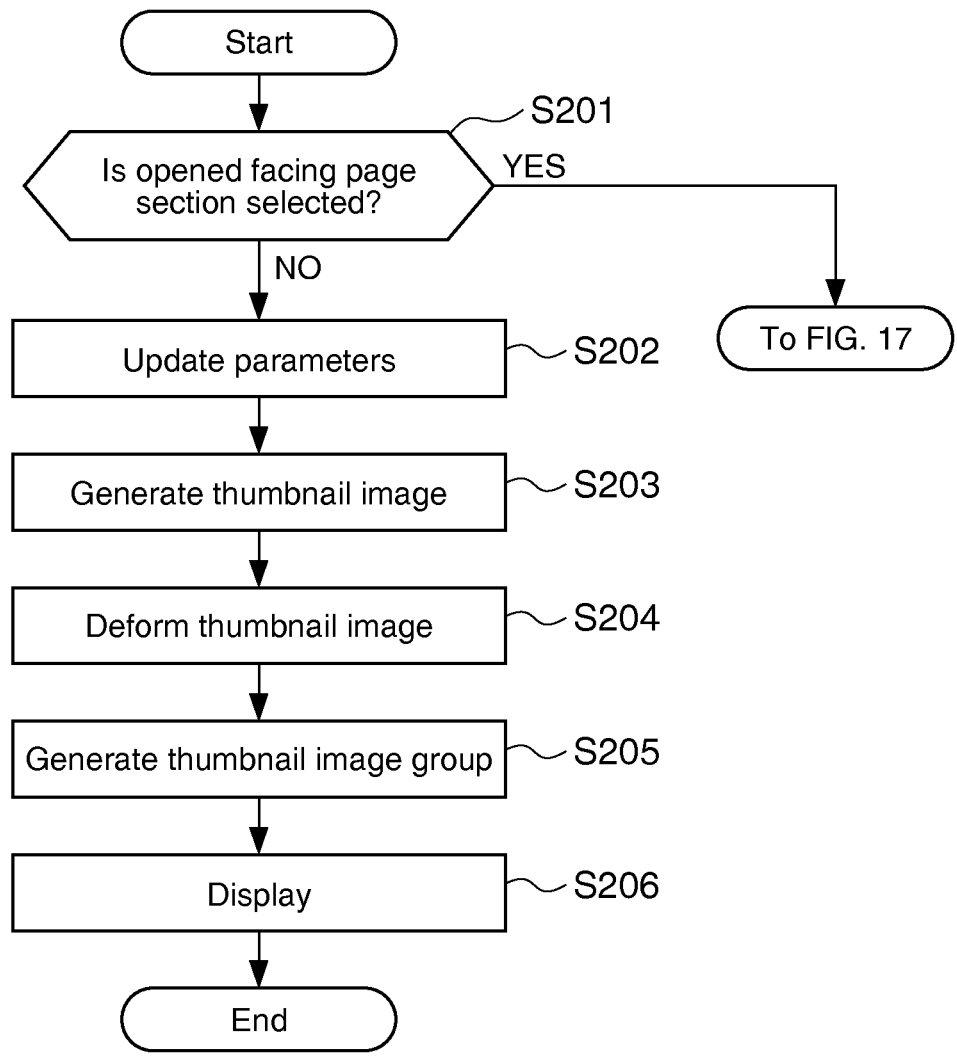
FIG. 14 shows an operation performed when a portion of the thumbnail image group G1 is selected.

FIG. 14 is a flow chart of operations performed when a portion of the thumbnail image group G1 is selected. The process flow in FIG. 14 is started with selection of a portion of the thumbnail image group G as a trigger.

In step S201, the control section 3 judges as to whether or not the selected portion corresponds to the opened facing page section. When a portion of the thumbnail image group G1 is selected, the operation section 9 outputs a signal indicative of information to be used for specifying the selection position. The control section 3 judges, based on the signal, as to whether or not the selected portion is at the opened facing page section. When it is judged that the opened facing page section is selected (S201: YES), the control section 3 changes the process over to a process flow shown in FIG. 17. When it is judged that a portion other than the opened facing page section is selected (S201: NO), the control section 3 moves the process over to step S202.

In step S202, the control section 3 updates parameters to be used for displaying the thumbnail image group G1. More specifically, the control section 3 updates the parameter SS1 indicative of the selected thumbnail image according to the position indicated by the signal outputted from the operation section 9. In the example shown in FIG. 13, a thumbnail image with i=7 is newly selected. In this case, the parameter SS1 is updated with SS1=7. The processings in steps S202-S206 are similar to those in steps S104-S107. As a result, a thumbnail image group G1 shown in FIG. 13B is displayed.

2-3. Operation at Menu Screen Example 2

Figure 15A:
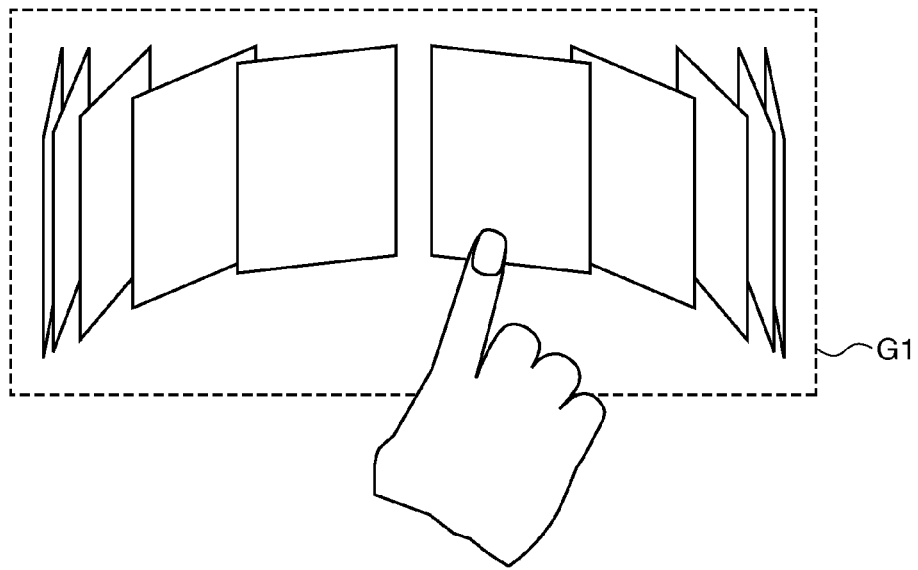
FIGS. 15A and 15B are views for describing another exemplary operation at the menu screen.
Figure 15B:
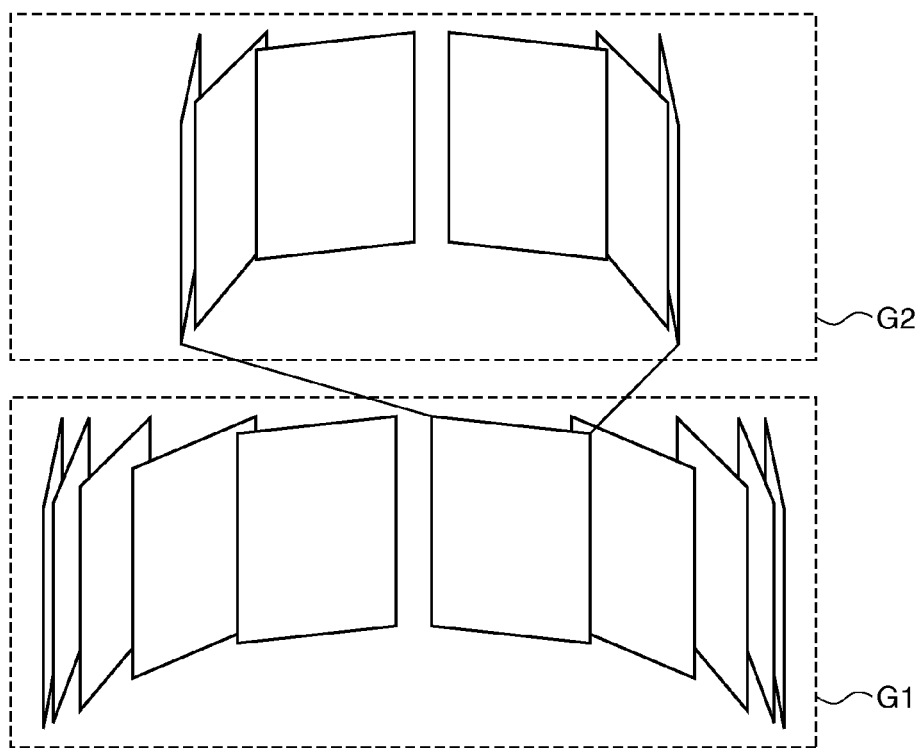

FIGS. 15A and 15B are views for describing another example of operations at the menu screen. FIGS. 15A and 15B show an operation example when a thumbnail image at the opened facing page section is selected in the thumbnail image group G1. FIG. 15A shows a menu screen before the thumbnail image is selected, and FIG. 15B shows a menu screen after the thumbnail image at the opened facing page section has been selected. In this example, when the thumbnail image at the opened facing page section is selected, an operation of an application program assigned to the selected thumbnail image is executed. As a result, a thumbnail image group G2 different from the thumbnail image group G1 is displayed. Hereafter, when multiple thumbnail image groups exist, they are distinguished from one another by using indexes, for example, as in a "thumbnail image group Gj." The index j indicates a hierarchical level in the thumbnail image groups. For example, the "thumbnail image group G2" represents that the thumbnail image group is in the second hierarchical level. In this example, a thumbnail image group that is displayed first in the menu screen is the first hierarchical level thumbnail image group, and a thumbnail image group that is called from the first hierarchical level thumbnail image group is the second hierarchical level thumbnail image group. In generalized terms, a thumbnail image group called from a thumbnail image group G (j−1) is a thumbnail image group Gj. More specifically, in this example, the operation of the application program assigned to the thumbnail image is an operation of newly displaying a plurality of thumbnail images, each of which is assigned with an operation of an application program, in the $(j+1)$-$^{th}$ hierarchical level (an example of the second row) different from the j-$^{th}$ hierarchical level (an example of the first row).

FIG. 16 is a table exemplifying data indicative of corresponding relation between application programs and operations. The data is stored in the storage section 8. The data include identifiers of thumbnail image groups, identifiers of thumbnail images (thumbnail IDs), identifiers of application programs (application IDs), operations assigned to the thumbnail images, and file names of setting files corresponding to the operations. In this example, the operation assigned to the thumbnail images is "Full Screen Display" or "Thumbnail Display." The "Full Screen Display" means to start up the application program, and display the execution screen (window) of the application program in generally the entire area of the display region. More specifically, thumbnail images assigned with the operation "Full Screen Display" correspond to contents (documents, still pictures, video pictures, voices and the like) usable by the application program. The "Thumbnail Display" means to display a thumbnail image group corresponding to the application program on the menu screen. For example, the data indicates that the application program "Word Processor" and the operation "Full Screen Display" are assigned to a thumbnail ID "Word Processor 1." Further, the data indicates that the application program "Browser" and the operation "Thumbnail Display" are assigned to a thumbnail ID "Browser 2," and the setting file name of the thumbnail display is "Browser 2 Setting."

FIG. 17 is a flow chart of operations performed when a thumbnail image at the opened facing page section is selected. In step S301, the control section 3 obtains an application program and an operation assigned to the selected thumbnail image. More specifically, the control section 3 reads the data shown in FIG. 16 from the storage section 8, and obtains an application program and an operation assigned to the selected thumbnail image. In step S302, the control section 3 judges as to whether or not the operation assigned to the selected thumbnail image is "Thumbnail Display." When the operation "Thumbnail Display" is assigned to the selected thumbnail image (S302: YES), the control section 3 moves the process over to step S303. When the operation "Full Screen Display" is assigned to the selected thumbnail image, in other words, when the operation "Thumbnail Display" is not assigned to the selected thumbnail image (S302: NO), the control section 3 moves the process over to step S304.

In step S303, the control section 3 generates and obtains a thumbnail image group. This process is performed in a manner similar to those of steps S101 through S107. In this example, a new thumbnail image group is displayed at a place different from the thumbnail image group G1.

FIG. 18 is a table showing an example of setting files for Thumbnail Display. Data stored as the setting files include thumbnail IDs, original image types, related data, and arrangement order. The thumbnail IDs are identifiers of thumbnail images. The original image type indicates the type of an original image. In the example, the original image type may be "static" or "dynamic." "Static" images may be predetermined images that are decided in advance. A static image may be, for example, an icon, a screen shot, or an animation. "Dynamic" images may be images that change according to the processing of the application program. A dynamic image may be, for example, a screen that shows results searched in a search program by using search terms, a screen that is displayed when a certain URL is inputted in a browser, or a screen that shows the current time in a clock program. The related data may be a parameter used at the time of operating an application program. The parameter may be, for example, a search term in the search program, a URL in the browser, or a deviation from the standard time in the clock program. The example shown in FIG. 18 indicates setting files for thumbnail images to which a search program is assigned. The table shows that the thumbnail image with Thumbnail ID being "a1" derives from an original image whose type is "static" and related data (the file name of the original image) is "aaa1." Also, the table shows that the thumbnail image with Thumbnail ID being "a2" derives from an original image whose type is "dynamic" and related data (a search term in this case) is "physics." Step S303 includes a section corresponding to the processings in step S101 and step S102, wherein the control section 3 reads out the setting files from the storage section 8 to obtain required information.

In the example, as described above, thumbnail image groups belonging to different hierarchical levels are displayed at mutually different locations. More specifically, a thumbnail image group in the (j+1)-$^{th}$ hierarchical level is displayed at a location relatively higher than a thumbnail image group in the j-$^{th}$ hierarchical level in the display region. Step S303 includes a section corresponding to the processing in step S103, wherein parameters indicative of the display positions according to the hierarchical levels of the thumbnail image groups are obtained. Lines connecting between the thumbnail image group G2 and the original thumbnail image called in the thumbnail image group G1 are displayed to make it visually recognizable as to which of the thumbnail images in the thumbnail image group G1 is called.

Referring back to FIG. 17, in step S303, the control section 3 starts up the application program assigned to the selected thumbnail image. The electronic apparatus 1000 operates according to the application program. For example, when the browser is started up, a window of the browser is displayed generally in the entire area of the display region.

Figure 19:
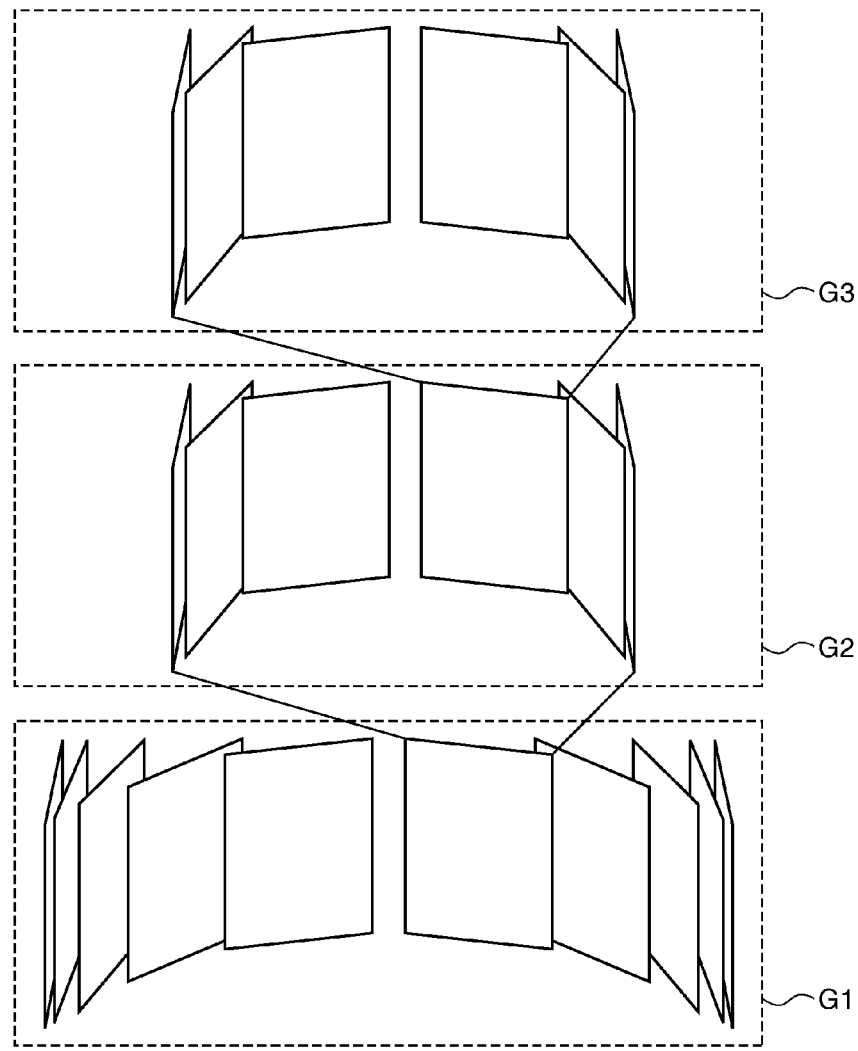
FIG. 19 shows an exemplary operation of calling a thumbnail image group G3 from a thumbnail image group G2.

FIG. 19 shows an exemplary operation of calling a thumbnail image group G3 from a thumbnail image group G2. FIG. 19 shows a state after the thumbnail image group G3 has been called from the state shown in FIG. 15B. FIGS. 15A and 15B show an example of calling a thumbnail image group G2 from a thumbnail image group G1, and the thumbnail image group G3 is called from the thumbnail image group G2 in a similar manner. More specifically, in this example, when a section of the second row (the thumbnail image group G2) is specified, the display control device 1104 displays a plurality of images (a thumbnail image group G3) each being assigned with an operation of an application program in a third row located in a predetermined direction with respect to the first row (the thumbnail image group G1) as viewed from the second row.

2-4. Examples of Application Program and Operation

Hereunder, some specific examples of operations to be performed when a thumbnail image at the opened facing page section is selected, in particular, some specific examples of application programs will be described.

(1) Search Program

When a thumbnail image of a search program is selected, screens showing search results found by using a certain search term may be displayed as thumbnail images in the next hierarchical level. The search term may be obtained from, for example, a search history. In this case, the thumbnail image group includes, for example, k thumbnail images of screens corresponding to the first k search results found in the history by using the search term and a thumbnail image of a screen displaying a search window.

(2) File Browser

When a thumbnail image of a file browser is selected, the next hierarchical level displays thumbnail images respectively corresponding to folders (directories) in a certain hierarchy. In this case, the thumbnail image group may include, for example, thumbnail images respectively corresponding to folders existing in a predetermined hierarchy, and thumbnail images respectively corresponding to files existing in that hierarchy. The deeper the hierarchical level of thumbnail image groups, the deeper the hierarchical level of folders corresponding to the thumbnail image groups become.

(3) Web Browser

When a thumbnail image of a web browser is selected, thumbnail images of HTML documents specified by certain URLs may be displayed in the next hierarchical level. Further, other HTML documents hyperlinked in the HTML documents are displayed as thumbnail images in the next-next hierarchical level. The deeper the hierarchical level of thumbnail image groups, the more the number of links from the first HTML documents increases.

(4) Shopping Program

When a thumbnail image of a shopping program is selected, thumbnail image groups containing different contents according to hierarchical levels may be displayed. For example, product-wise thumbnail images may be displayed in the second hierarchical level, and a plurality of thumbnail images showing word-of-mouth comments of a certain product may be displayed in the third hierarchical level.

(5) Scheduler (Calendar)

When a thumbnail image of a scheduler is selected, thumbnail image groups containing different contents according to hierarchical levels may be displayed. For example, thumbnail images of calendars of two months before and after today may be displayed in the second hierarchical level, thumbnail images of weekly calendars may be displayed in the third hierarchical level, and thumbnail images of daily calendars of one week may be displayed in the fourth hierarchical level.

(6) Clock

When a thumbnail image of a clock program is selected, thumbnail images of screens displaying various current local times in the world may be displayed in the next hierarchical level. For example, thumbnail images of screens displaying times based on Japan Standard Time, Eastern Standard Time in the U.S., and Greenwich Mean Time may be displayed.

2-5. Rewriting of Display

Next, the process of rewriting an image in step S107 and the like will be described in detail. In the electronic apparatus 1000, the display state of pixels from white (a lower density or a lower gray level) to black (a higher density or a higher gray level) or black to white changes by application of voltages (accumulation of charges) across a plurality of frames. In other words, application of voltages in a single frame does not change the pixels to a desired display state.

Figure 20:
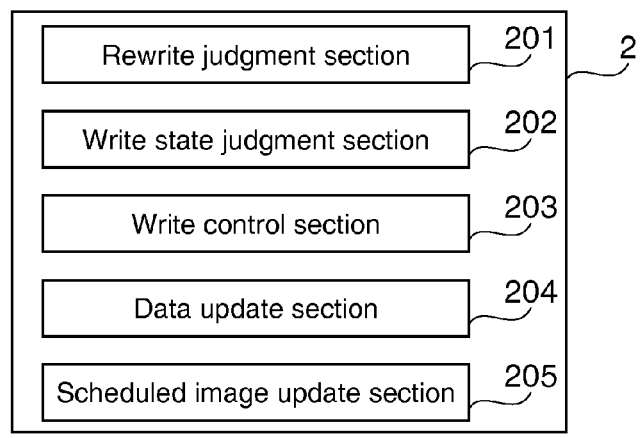
FIG. 20 is a block diagram showing a functional configuration of a controller 2.

FIG. 20 is a block diagram showing a functional configuration of the controller 2. The controller 2 includes a rewrite judgment section 201, a write state judgment section 202, a write control section 203, a data update section 204, and a scheduled image update section 205. These functions may be realized by hardware. In another example, the controller 2 may be provided with a processor, and the processor may execute a program to realize each of the functional blocks.

The rewrite judgment section 201 compares image data stored in the VRAM 4 with image data stored in the scheduled image data memory region 7, and judges as to whether or not they are different from each other. The write state judgment section 202 refers to data stored in the write data memory region 6, and judges as to whether or not a rewrite operation to change the pixels from black to white or white to black is in progress. The write data memory region 6 includes a white write data memory region 6A that stores data, for each of the pixels, indicative of whether or not an operation of changing the display state of the pixel from black to white is in progress (first write data), and a black write data memory region 6B that stores data, for each of the pixels, indicative of whether or not an operation of changing the display state of the pixel from white to black is in progress (second write data).

The write control section 203 controls the scanning line drive circuit 53 and the data line drive circuit 54 so as to supply data signals to the pixel electrodes 13$a$ of desired pixels. The data update section 204 writes data to the white write data memory section 6A and the black write data memory section 6B. The scheduled image update section 205 overwrites image data stored in the schedule image data memory region 7 with image data stored in the VRAM 4.

Figure 21:
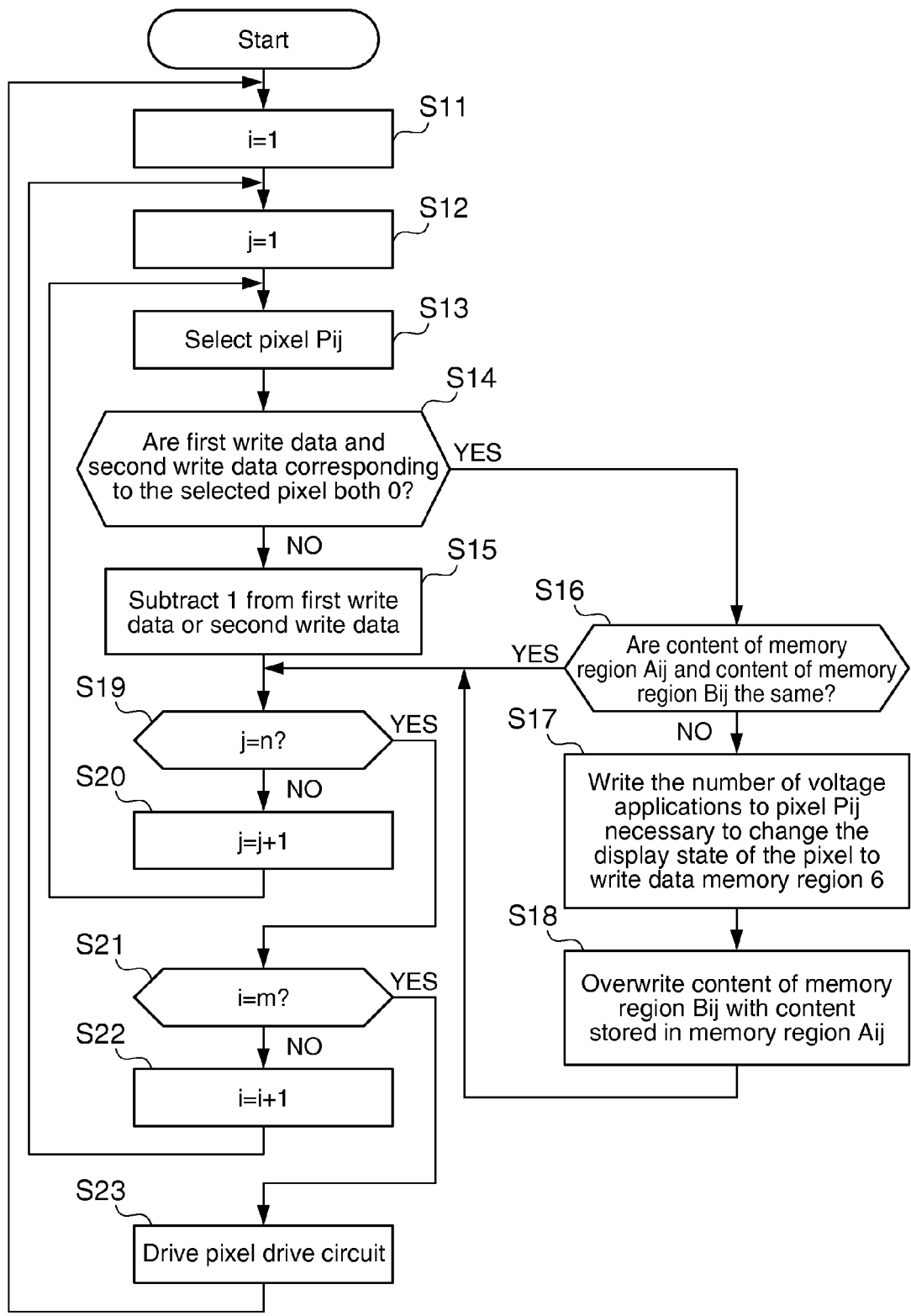
FIG. 21 is a flow chart showing a driving process of the display section 1 performed by the controller 2.

FIG. 21 is a flow chart showing a process of driving the display section 1 by the controller 2. In the following description, a pixel at the i-$^{th}$ row and j-$^{th}$ column in the display section 1 is referred to as a pixel Pij. A region in the VRAM 4 that stores data indicative of the gray level of the pixel Pij is a memory region Aij. In this example, data stored in the memory region Aij are binary values, 0 (black) or 7 (white). A region in the scheduled image data memory region 7 that stores scheduled image data of the pixel Pij is a memory region Bij. The scheduled image data is data indicative of the state of the display section 1 at the time of completion of the write processing in progress. In this example, data stored in the memory region Bij are binary values, 0 (black) or 7 (white). The write data memory region 6 includes the white write data memory region 6A and the black write data memory region 6B. The white write data memory region 6A stores the number of remaining voltage applications at each pixel necessary to turn the gray level from black to white as first write data. The black write data memory region 6B stores the number of remaining voltage applications at each pixel necessary to turn the gray level from white to black as second write data. A memory region Cij is a region in the white write data memory region 6A to store data indicative of the number of remaining voltage applications at the pixel Pij. A memory region Dij is a region in the black write data memory region 6B to store data indicative of the number of remaining voltage applications at the pixel Pij.

In step S11 and S12, the write state judgment section 202 initializes values of the variables i and j. In this example, the variables i and j are initialized to 1 (i=1 and j=1). In step S13, the write state judgment section 202 selects a pixel Pij specified by the variables i and j. For example, when the value of the variable i is 1, and the value of the variable j is 1, a pixel P11 is selected.

In step S14, the write state judgment section 202 judges as to whether both of the first write data stored in the memory region Cij and the second write data stored in the memory region Dij are 0. In other words, the write state judgment section 202 judges as to whether the write processing for the pixel Pij is not continued. When both of the first write data and the second write data corresponding to the pixel Pij are 0 (step S14: YES), the write state judgment section 202 moves the processing over to step S16. When one of the first write data and the second write data corresponding to the pixel Pij is not 0 (step S14: NO), the write state judgment section 202 moves the processing over to step S15.

In step S15, the data update section 204 subtracts 1 from the first write data or the second write data whose value is other than 0. It is noted that data update section 204 does not subtract 1 for the first write data or the second write data whose value is 0. In step S19, the data update section 204 judges as to whether or not the value of the variable j is the same as the number n of the data lines. If the value of the variable j is not n (step S19: NO), the data update section 204 adds 1 to the value of the variable j (step S20). After adding 1 to the value of the variable j, the data update section 204 moves the processing over to step S13. When the value of the variable j is n (step S19: YES), the data update section 204 shifts the processing to step S21. In step S21, the data update section 204 judges as to whether or not the value of the variable i is the same as the number m of the scanning lines. If the value of the variable i is not m (step S21: NO), the data update section 204 adds 1 to the value of the variable i (step S22). After adding 1 to the value of the variable i, the data update section 204 shifts the processing to step S12. When the value of the variable i is m (step S21: YES), the data update section 204 moves the processing over to step S23. In step S23, the write control section 203 controls the scanning line drive circuit 53 and the data line drive circuit 54 to drive the pixel drive circuit.

In step S16 (judgment step), the rewrite judgment section 201 judges as to whether the data stored in the memory region Aij is the same as the data stored in the memory region Bij. If these data are different (step S16: NO), the rewrite judgment section 201 moves the processing over to step S17.

In step S17 (data update step), the data update section 204 writes, to the write data memory region 6, the number of voltage applications to the pixel Pij necessary to change the gray level of the pixel Pij to the gray level of the memory region Aij. In step S18, the scheduled image update section 205 overwrites the content of the memory region Bij with the content stored in the memory region Aij.

Figure 22:
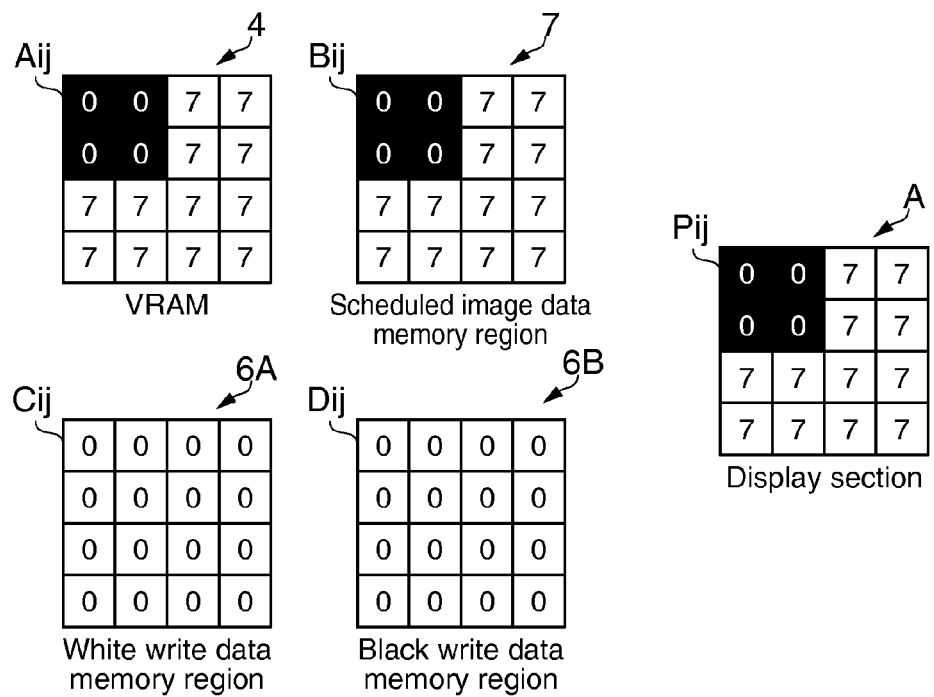
FIG. 22 shows views exemplifying data stored in a memory.

FIG. 22 shows diagrams exemplifying data stored in the memories. Here, the operation is described, using pixels P11-P44 in an array of four rows by four columns which form a part of the display section 1, as an example. In this example, the gray level of each of the pixels is presented in 8 levels between 0 and 7. The gray level level 7 corresponds to white, and the gray level 0 corresponds to black. To facilitate understanding of the figure, numerical values are described at the pixels, but these numbers are not displayed. In the example of FIG. 22, the pixels P11, P12, P21 and P22 are black, and other pixels are white. The figure shows a state in which none of the pixels is in progress of writing, and writing has been completed for the entire pixels.

Figure 23:
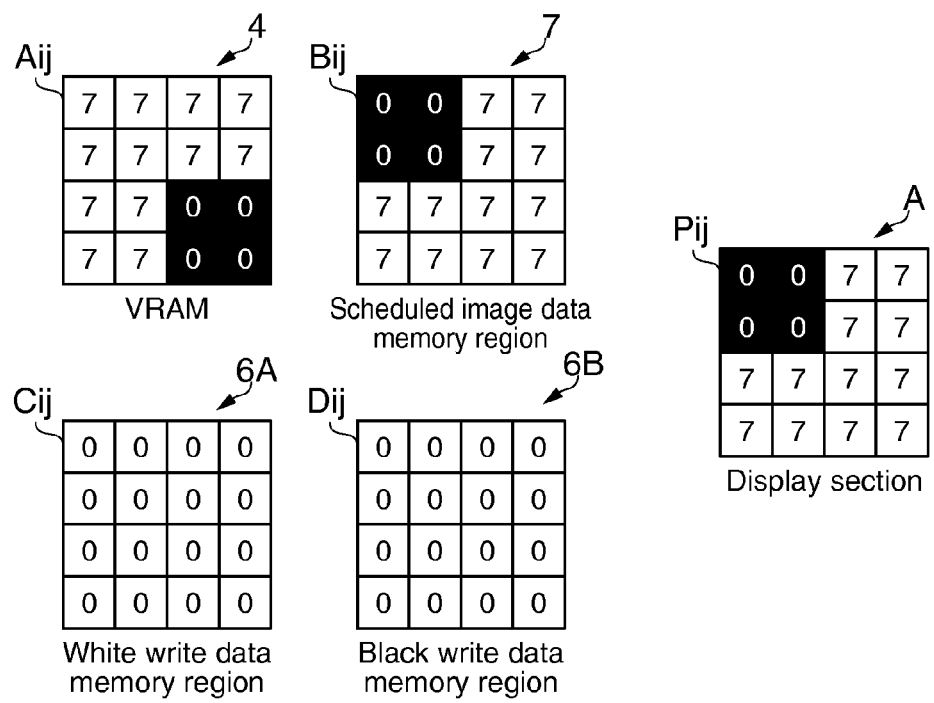
FIG. 23 shows views exemplifying a state in which VRAM 4 is rewritten.

FIG. 23 shows diagrams exemplifying a state in which the VRAM 4 is rewritten. In this example, the pixels P33, P34, P43 and P44 are black, and other pixels are white. Rewriting of the VRAM 4, in other words, writing data to the VRAM 4 (data writing step) is executed by the control section 3. Now, the operation is described using an example in which the pixel P11 is selected in step S13 in the state shown in FIG. 23. In this case, as data stored in the memory regions C11 and D11 are both 0, the judgment result in step S14 is YES. Next, as the data in the memory region A11 and the memory region B11 are not the same, the judgment result in step S16 is NO. In step S17, the data of the memory region B11 is written to the memory region C11. In step S18, the data of the memory region A11 is written to the memory region B11.

Figure 24:
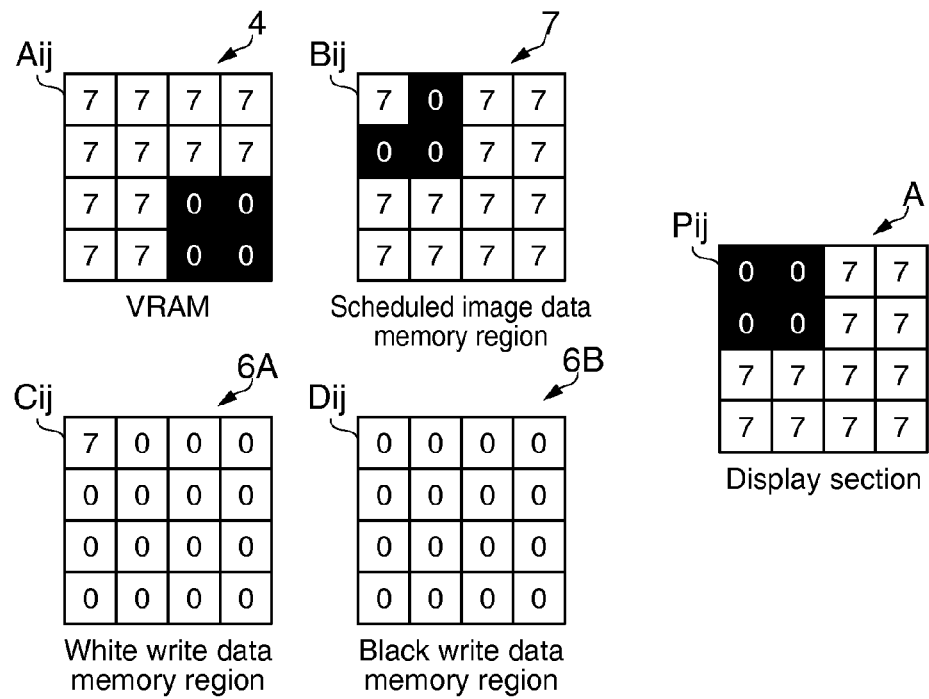
FIG. 24 shows views exemplifying a state in which data in a memory region B11 is rewritten.

FIG. 24 shows diagrams exemplifying a state in which the data in the memory region B11 is rewritten. Next, the target pixel is updated to the pixel P12. As the data stored in the memory regions C12 and D12 are both 0, the judgment result in step S14 is YES. Next, as the data of the memory region A12 and the data of the memory region B12 are not the same, the judgment result in step S16 is NO. In step S17, data indicative of the number of voltage applications (7 times in this example) is written to the memory region C12. In step S18, the data of the memory region A12 is written to the memory region B12.

Figure 25:
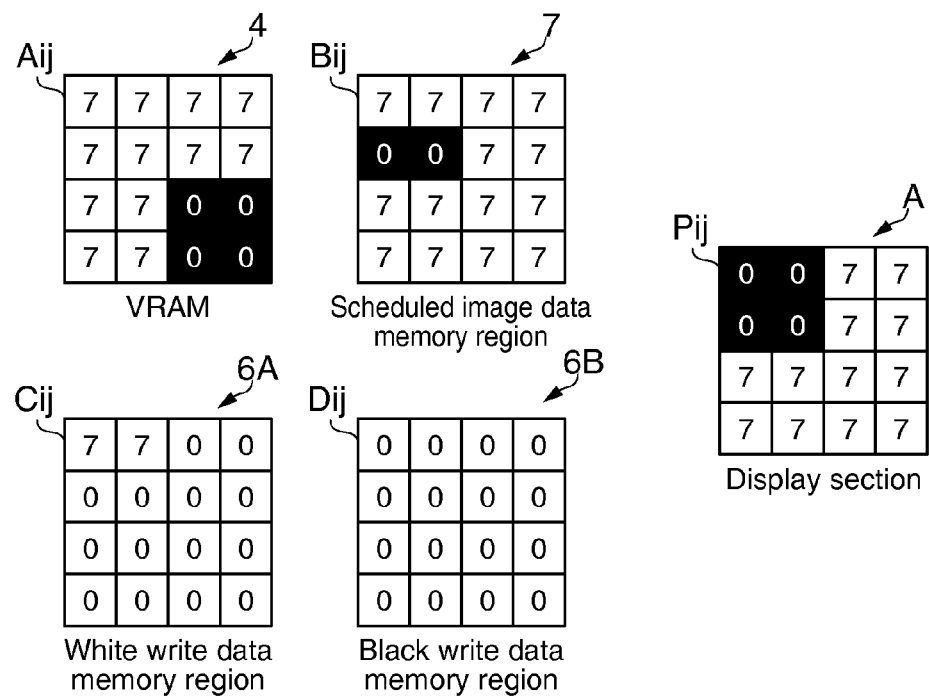
FIG. 25 shows views exemplifying a state in which data in a memory region B12 is rewritten.

FIG. 25 shows diagrams exemplifying a state in which the data in the memory region B12 has been rewritten. Similarly, when the processing advances up to the pixel P44, the data stored in the scheduled image data memory region 7 becomes equal to the data stored in the VRAM 4.

Figure 26:
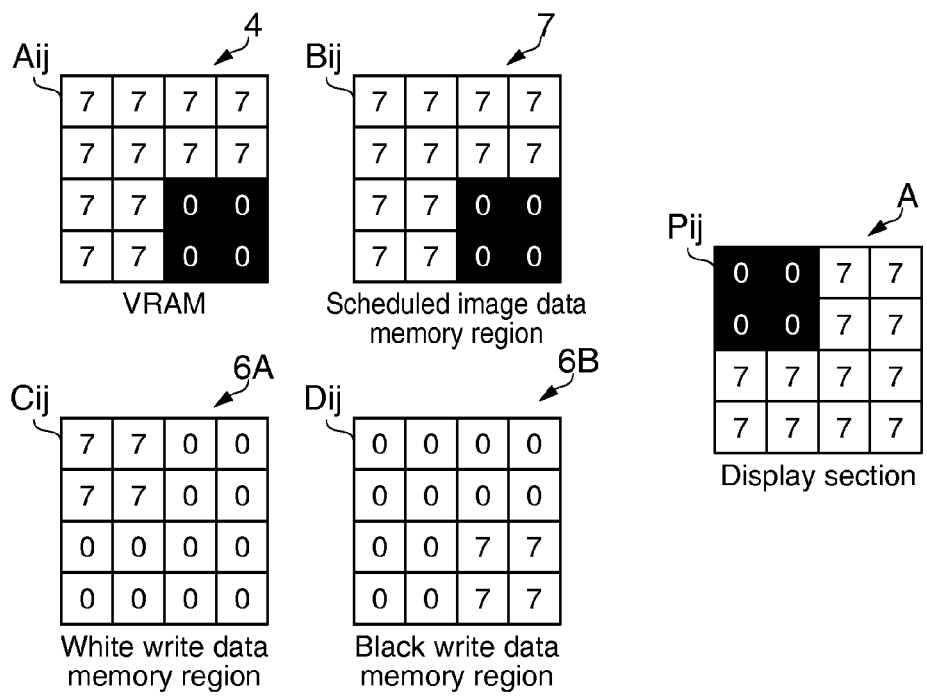
FIG. 26 shows views exemplifying a state in which data of the entire pixels have been rewritten.

FIG. 26 shows diagrams exemplifying a state in which data for the entire pixels have been rewritten. For those of the pixels whose gray level is to be changed from black to white, the data stored in the corresponding memory regions Cij (C11, C12, C21 and C22) are "7." For those of the pixels whose gray level is to be changed from white to black, the data stored in the corresponding memory regions Dij (D33, D34, D43 and D44) are "7." In the memory regions Cij and Dij, the data of the other pixels are "0."

When the data rewriting is completed, the write control section 203 drives the display section 1. When the scanning line in the i-$^{th}$ row is selected, for those of the pixels whose corresponding data in the memory regions Cij are other than 0, the write control section 203 performs a voltage application control such that the potential on the pixel electrodes 13a becomes lower with the potential Vcom on the transparent electrode 32 as a reference. For those of the pixels whose corresponding data in the memory regions Dij are other than 0, the write control section 203 performs a voltage application control such that the potential on the pixel electrodes 13a (a potential difference between the pixel electrode 13a and the transparent electrode 32 is hereafter simply called a "pixel voltage" with the potential Vcom on the transparent electrode 32 as a reference) becomes higher with the potential Vcom on the transparent electrode 32 as a reference. For example, for the pixel P11, the data stored in the memory region C11 is not 0. Therefore, when the scanning line in the 1$^{st}$ row is selected, a voltage for setting the voltage on the pixel to −15V is applied to the data line in the 1$^{st}$ column. In another example, for the pixel P33, the data stored in the memory region D33 is not 0. Therefore, when the scanning line in the 3$^{rd}$ row is selected, a voltage for setting the voltage on the pixel to +15V is applied to the data line in the 3$^{rd}$ column. Further, for those of the pixels Pij whose data in the corresponding memory regions Cij and in the corresponding memory regions Dij are both 0, a voltage for setting the voltage on the pixels to 0V is applied to the data line in the j-$^{th}$ column.

Figure 27:
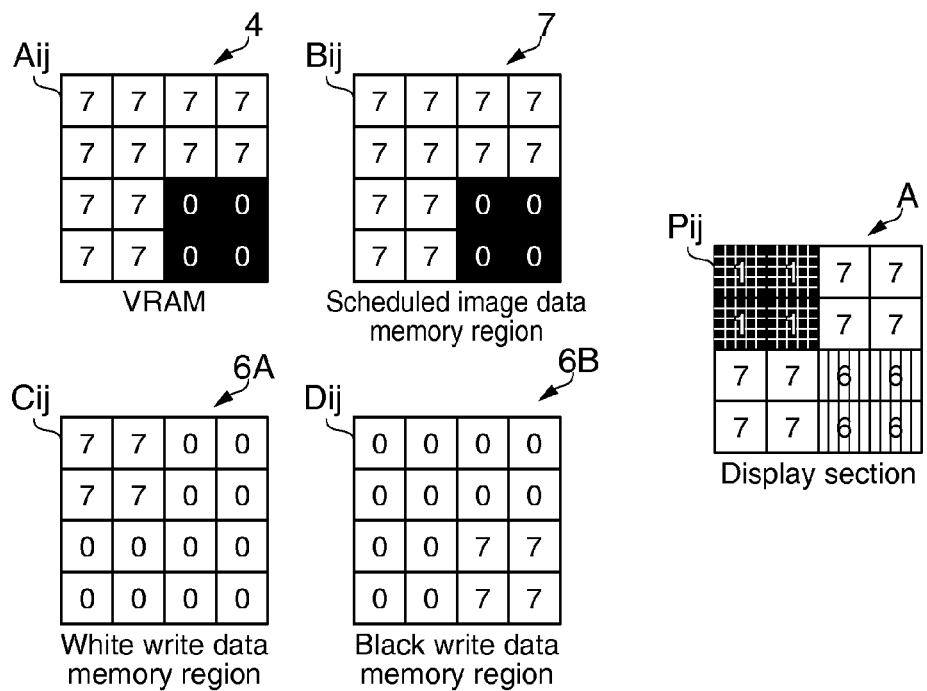
FIG. 27 shows views exemplifying a state in which voltage applications for one frame have been conducted after the state shown in FIG. 26.

FIG. 27 shows diagrams exemplifying a state in which voltage applications have been conducted for one frame from the state shown in FIG. 26. At the pixels in the display section 1, their gray level has changed due to migration of the charged particles. In this example, the pixels P11, P12, P21 and P22 have become lighter from black to a gray level achieved by the voltage applications for one frame, and the pixels P33, P34, P43 and P44 have become darker from white to a gray level achieved by the voltage applications for one frame.

When the voltage applications for one frame are completed, the process by the controller 2 is repeated from step S11 again. When the pixel P11 is selected in step S13 in the state shown in FIG. 27, the data stored in the memory region C11 is not 0, such that the judgment result in step S14 is NO. In step S15, 1 is subtracted from the data (data other than 0) stored in the memory region C11, such that the data in the memory region C11 becomes 6. In a similar manner described above, data in the memory regions for the entire pixels are rewritten.

Figure 28:
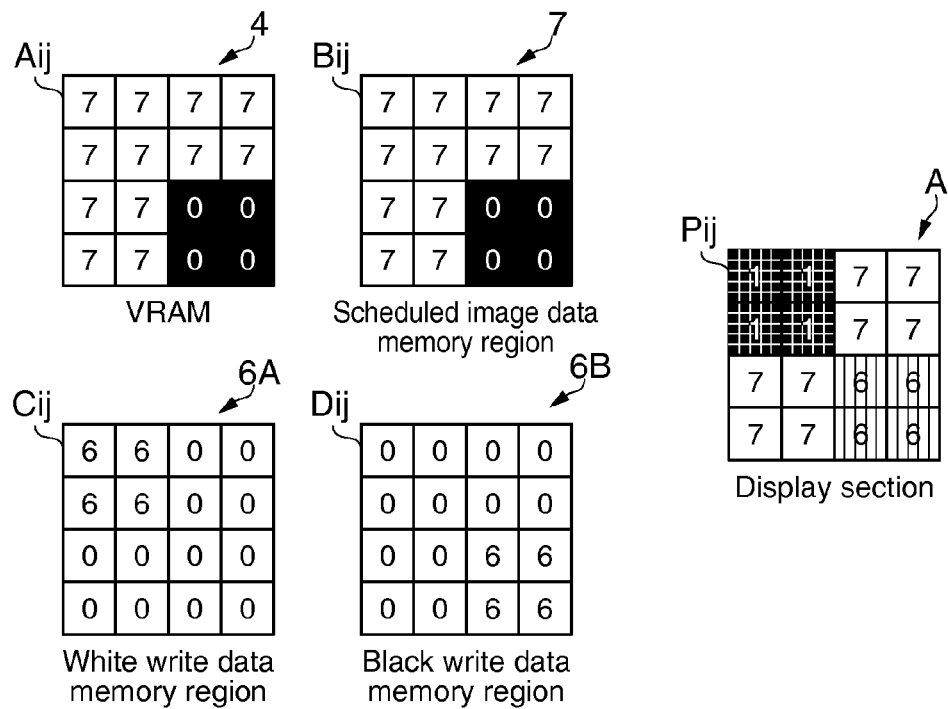
FIG. 28 shows views exemplifying a state in which rewriting of data in write data memory regions is completed.

FIG. 28 shows diagrams exemplifying a state in which rewriting of data in the write data memory regions for the entire pixels has been completed. In comparison with the state shown in FIG. 27, the state in FIG. 28 is different in that the data in the memory regions C11, C12, C21 and C22, and the data in the memory regions D33, D34, D43 and D44 have changed to six.

Figure 29:
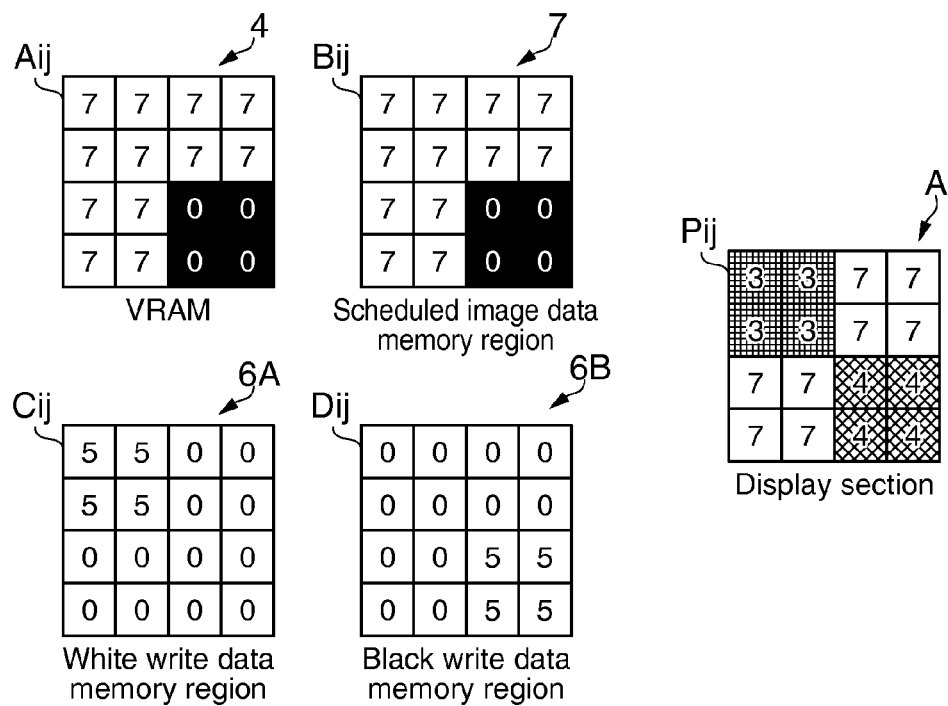
FIG. 29 shows views exemplifying a state immediately after the processing in step S23 has been performed.

FIG. 29 shows a state immediately after the processing in step S23 has been executed for the second time since the state shown in FIG. 28. Compared to the state shown in FIG. 28, the state in FIG. 29 is different in that the data in the memory regions C11, C12, C21 and C22, and the data in the memory regions D33, D34, D43 and D44 have changed to five. Further, the state in FIG. 29 is different from the state in FIG. 28 in that the gray level at the pixels P11, P12, P21 and P22 in the display section 1 has changed to three, and the gray level at the pixels P33, P34, P43 and P44 has changed to four. Here, let us consider operations when data in the VRAM 4 is rewritten in the state shown in FIG. 29 (immediately after the processing in step S23 has been executed for the second time).

Figure 30:
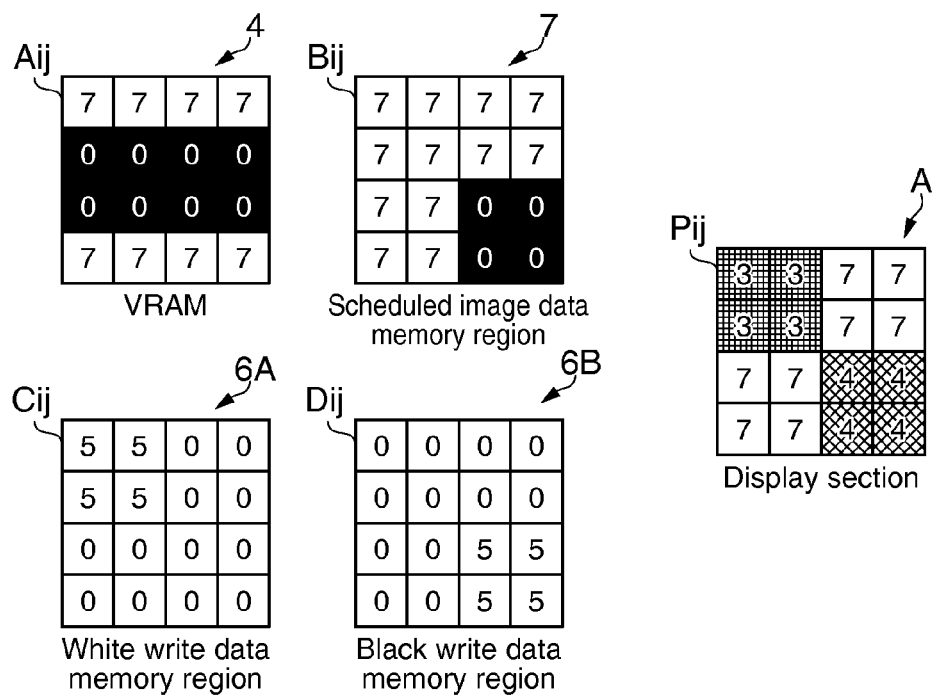
FIG. 30 shows views exemplifying a state in which data in the VRAM 4 has been rewritten.

FIG. 30 shows diagrams exemplifying a state in which data in the VRAM 4 are rewritten. In this example, all of the pixels in the 1$^{st}$ row and the 4$^{th}$ row are white, and all of the pixels in the 2$^{nd}$ row and the 3$^{rd}$ row are black. In this state, the controller 2 executes the processings from step S11. For example, when the pixel P21 is selected in step S13, the judgment result in step S14 is NO. In step S15, 1 is subtracted from the data in the memory region C21 and it becomes 4. In another example, when the pixel P23 is selected in step S13, the judgment result in step S14 is YES. Further, the judgment result in step S16 is NO. Therefore, the process proceeds to step S17. In step S17, "7" is written as data in the memory region D23. In step S18, the data in the memory region A23 is written to the memory region B23. In this manner, even when data in the VRAM 4 are rewritten, for those of the pixels in progress of rewriting (for example, the pixels P11, P12, P21, P22, P33, P34, P43 and P44 in the example of FIG. 30), the rewriting process in progress (the process of rewriting pixels based on the data of the VRAM 4 prior to rewriting) is continued. On the other hand, for those of the pixels not in progress of rewriting (for example, the pixels P13, P14, P23, P24, P31, P32, P41 and P42), the pixel rewriting process is conducted based on the rewritten data of the VRAM 4.

Figure 31:
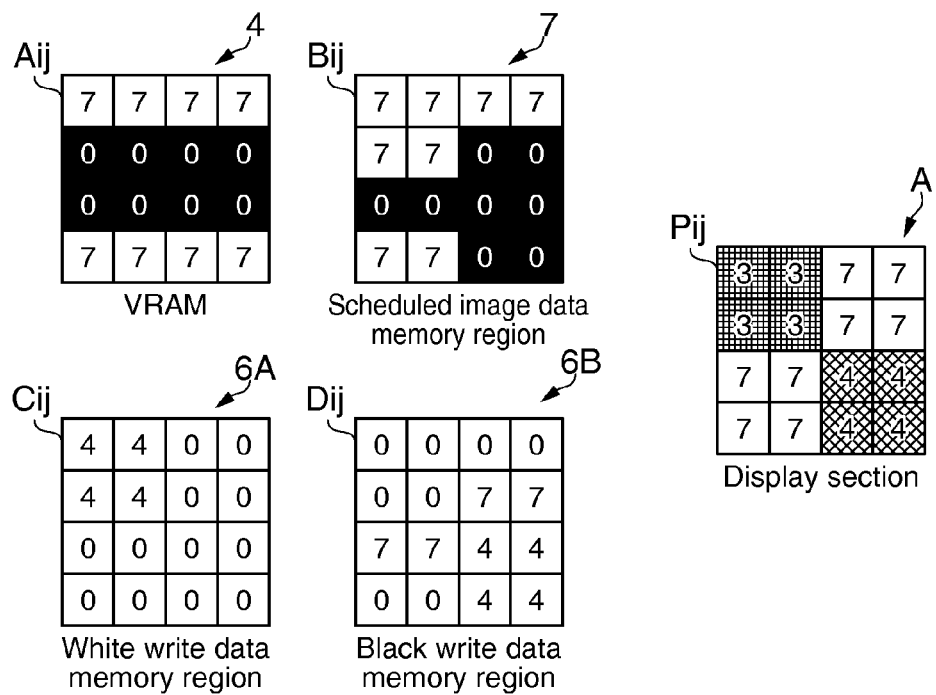
FIG. 31 shows views exemplifying a state in which data rewriting has been completed for the entire pixels.

FIG. 31 shows diagrams exemplifying a state in which data rewriting process for the entire pixels has been completed since the state shown in FIG. 30. Comparing to the state shown in FIG. 30, the state in FIG. 31 is different in that the data in the memory regions B23, B24, B31 and B32 have been rewritten to 0, the data in the memory regions C11, C12, C21, C22, D33, D34, D43 and D44 have been rewritten to 4, and the data in the memory regions D23, D24, D31 and D32 have been rewritten to 7.

Figure 32:
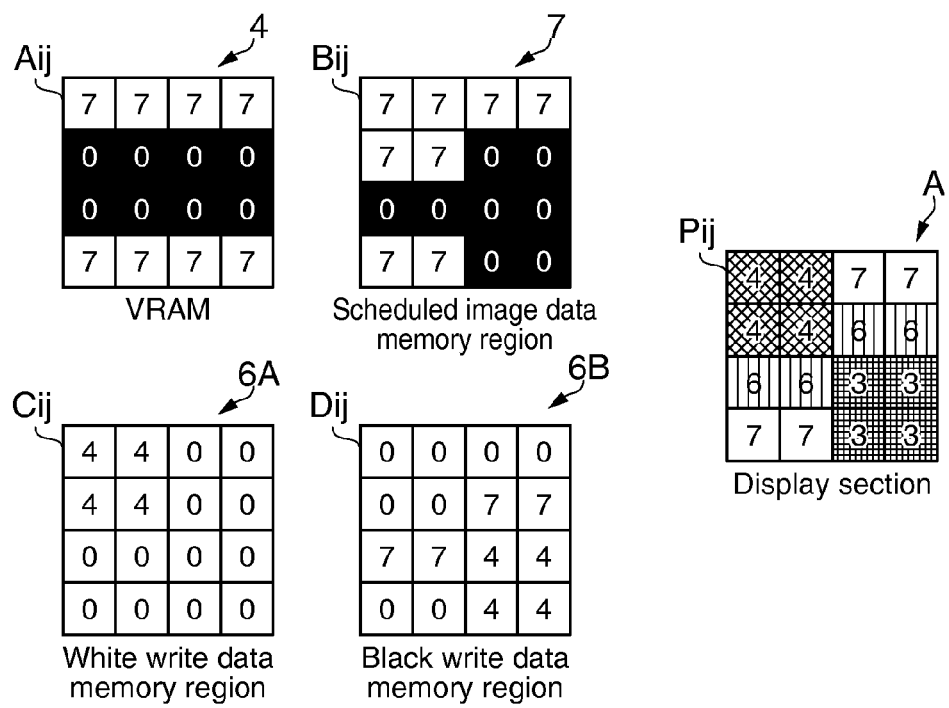
FIG. 32 shows views exemplifying a state in which a processing in step S23 has been conducted.

FIG. 32 shows diagrams exemplifying a state in which the processing in step S23 has been conducted since the state shown in FIG. 31. For those of the pixels that have already been in progress of rewriting prior to the data rewriting occurred in the VRAM 4 (the pixels P11, P12, P21, P22, P33, P34, P43 and P44), the ongoing rewriting process is continued irrespective of the data of the VRAM 4 after the rewriting has taken place. Among pixels that have become necessary to be rewritten after the data rewriting occurred in the VRAM 4, for those of the pixels that were not in progress of rewriting prior to the data rewriting in the VRAM 4 (the pixels P13, P14, P31 and P32), rewriting of the pixels is started based on the data of the VRAM 4 after the rewriting.

Figure 33:
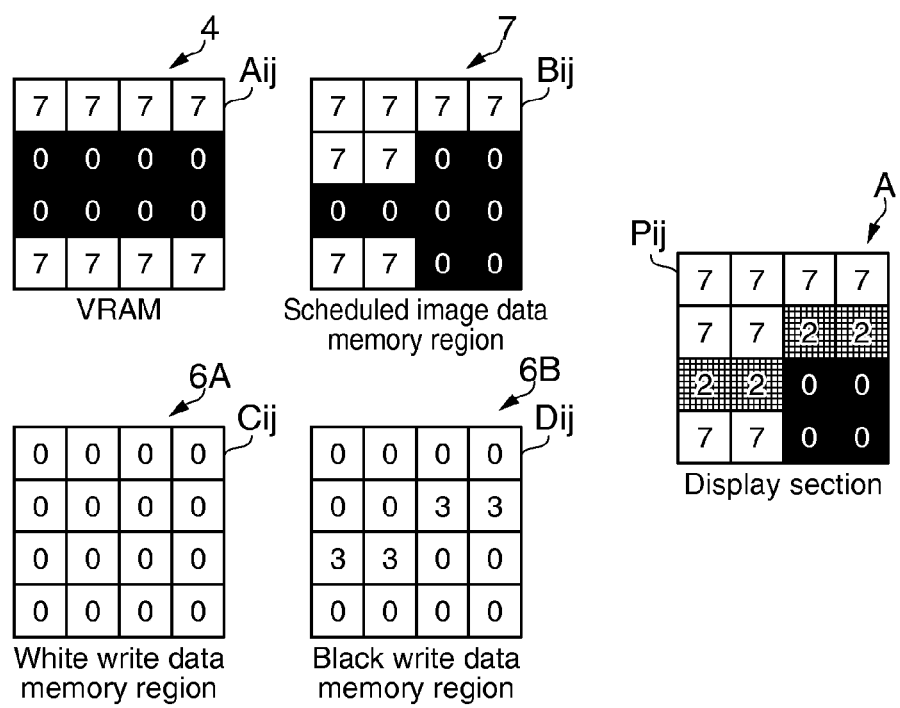
FIG. 33 shows views exemplifying a state in which voltage applications in a predetermined number of times have been completed.

FIG. 33 shows diagrams exemplifying a state in which the rewriting process has been further advanced from the state shown in FIG. 32, where voltage applications in a predetermined number of times have been completed for those of the pixels that were already in progress of rewriting prior to rewriting of the data of the VRAM 4 (the pixels P11, P12, P21, P22, P33, P34, P43 and P44). In this state, in the write data memory regions 6, the data in the memory regions D23, D24, D31 and D32 are 3, and the data in other memory regions are 0. In the display section 1, the gray level at the pixels P23, P24, P31 and P32 is 2; the gray level at the pixels P33, P34, P43 and P44 is 0; and the gray level at the other pixels is 7. For example, if the pixel P21 is selected in step S13 in this state, the judgment result in step S14 is YES. Further, the judgment result in step S16 is NO. In step S17, "7" is written as data of the memory region D21. In step S18, "0" which is the same data as that of the memory region A21 is written to the memory region B21.

Figure 34:
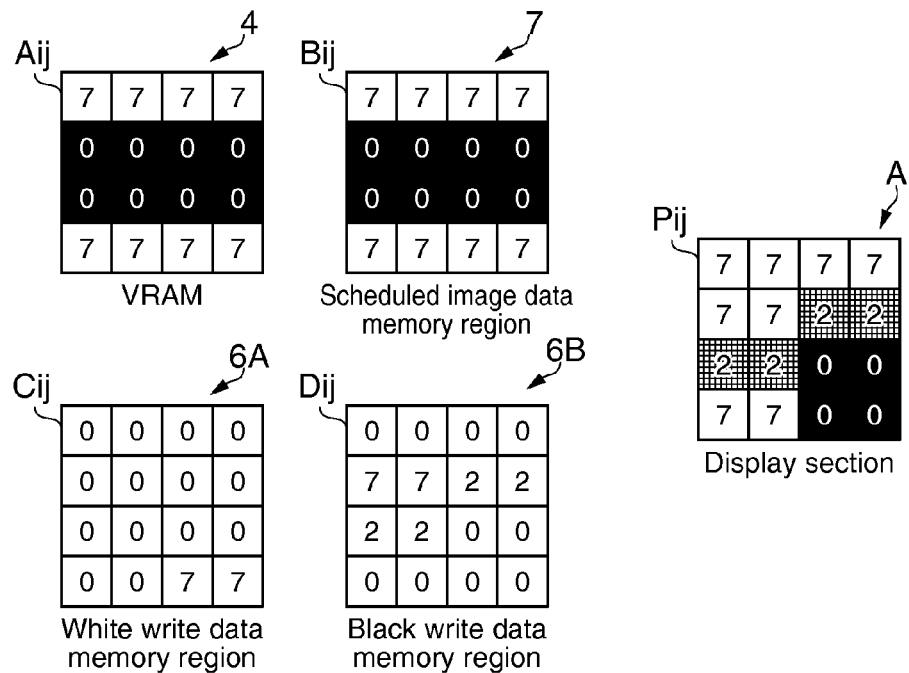
FIG. 34 shows views exemplifying a state in which data rewriting has been completed for the entire pixels.

FIG. 34 shows diagrams exemplifying a state in which the data rewriting for the entire pixels has been completed. Comparing to the state shown in FIG. 33, the state shown in FIG. 34 is different in that the values in the memory regions B21 and B22 have become 0, and the data in the memory regions B43 and B44 have become 7; the data in the memory regions C43, C44, D21 and D22 have become 7; and the data in the memory regions D23, D24, D31 and D32 have become 2.

Figure 35:
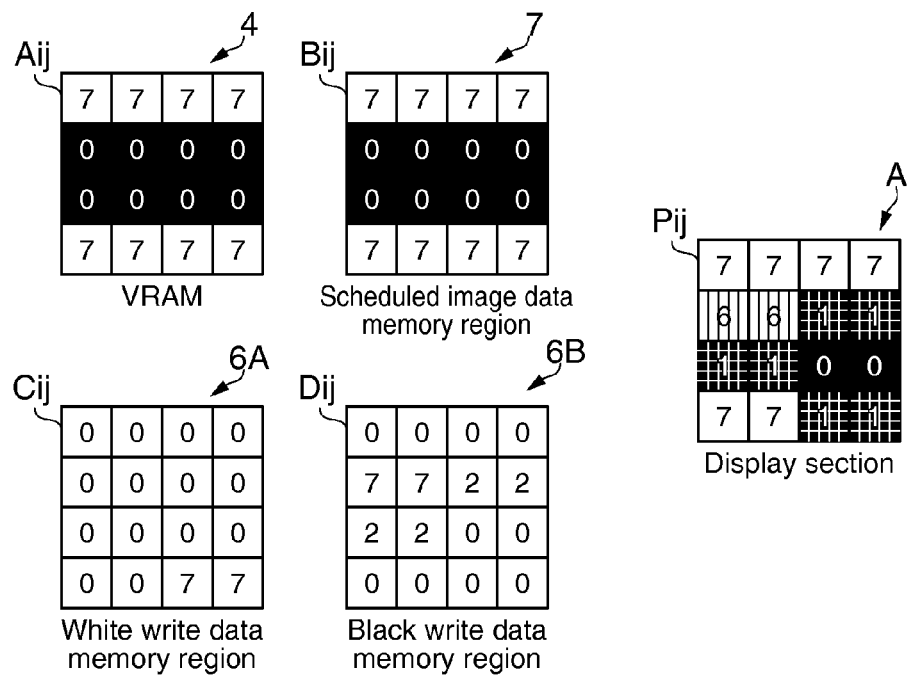
FIG. 35 shows views exemplifying a state in which pixels have been written from the state shown in FIG. 34.

FIG. 35 shows diagrams exemplifying a state in which the pixels have been rewritten since the state shown in FIG. 34. Comparing to the state shown in FIG. 34, the state in FIG. 35 is different in that the gray level of the pixels P23, P24, P31 and P32 has become 1; the gray level of the pixels P21 and P22 has become 6; and the gray level of the pixels P43 and P44 has become 1.

Figure 36:
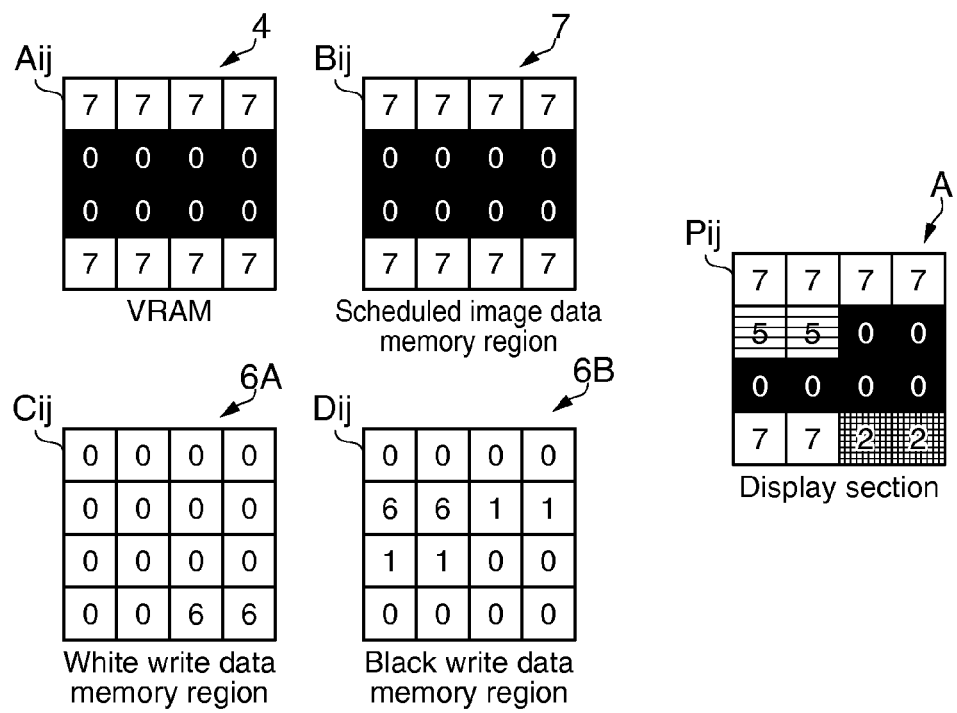
FIG. 36 shows views exemplifying a state in which the process has advanced by one frame from the state shown in FIG. 35.

FIG. 36 shows diagrams exemplifying a state in which the process has advanced by one frame from the state shown in FIG. 35. Comparing to the state shown in FIG. 35, the state in FIG. 36 is different in that the gray level of the pixels P23, P24, P31 and P32 has become 0; the gray level of the pixels P21 and P22 has become 5; and the gray level of the pixels P43 and P44 has become 2. Further, comparing to the state shown in FIG. 35, the state in FIG. 36 is different in that the data in the memory regions C43, C44, D21 and D22 have become 6; and the data in the memory regions D23, D24, D31 and D32 have become 1.

Figure 37:
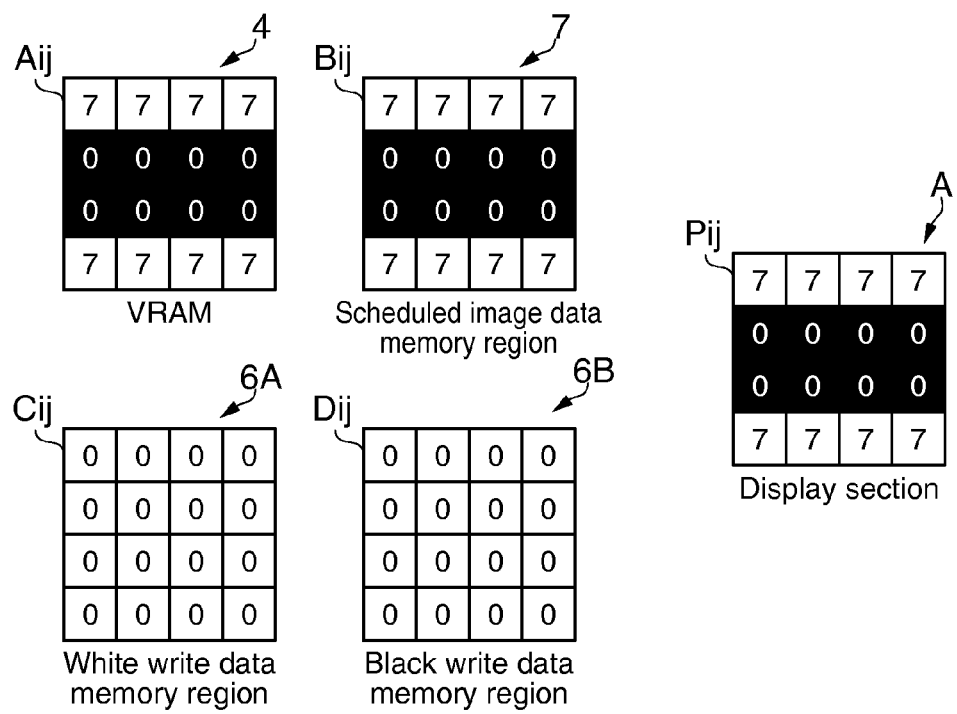
FIG. 37 shows views exemplifying a state in which the process has advanced from the state shown in FIG. 36.

FIG. 37 shows diagrams exemplifying a state in which the process has advanced from the state shown in FIG. 36. In this state, the data in the VRAM 7 coincide with the gray levels in the display section 1. Also, all the data stored in the write data memory regions are 0, indicating that the writing processing for the entire pixels has been completed.

In summary, the display section 1 includes a plurality of pixels; and by a display rewriting process, the gray levels of the pixels are updated by a writing operation of applying voltages multiple times to the pixels. The display rewriting process includes the steps of comparing image data representative of an image to be newly displayed on the display section 1 with scheduled image data representative of an image scheduled to be displayed on the display section 1 by the write operation in progress, thereby judging pixels whose gray level is to be changed among the plurality of pixels (step S16), and the steps of starting the write operation for a pixel to reach a gray level defined by the image data, when the pixel that is determined to be the pixel whose gray level is to be changed is not in the write operation, and starting the write operation for a pixel to reach a gray level defined by the image data, after the write operation in progress is completed, when the pixel that is determined to be the pixel whose gray level is to be changed is in the write operation (step S23).

In accordance with the present embodiment, even when a region where rewriting has already started and a region where rewriting is to be newly started partially overlap each other, the rewriting is immediately started in a portion where rewriting is not in progress at the time of newly starting the rewriting. Therefore, the user feels that the display speed is faster. Also, in accordance with the present embodiment, it is possible to have pixels to which a positive voltage is applied and a negative voltage is applied coexisted in a single frame (a drive scheme in which a positive voltage and a negative voltage can both be selected in a single frame is called a "bipolar drive").

3. Other Embodiments

The invention is not limited to the embodiments described above, and can be implemented in various modes. Some of modified examples will be described below. It is noted that two or more of the following modified examples may be combined.

3-1. Modified Example 1

Figure 38:
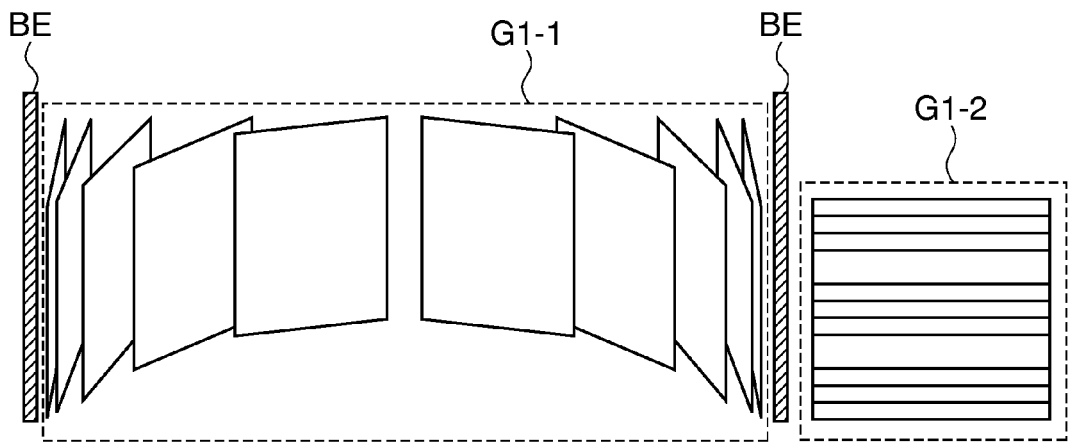
FIG. 38 is a view showing an example of a menu screen in accordance with a modified example 1.

FIG. 38 is a view exemplifying a menu screen in accordance with a modified example 1. In this example, the menu screen includes a thumbnail image group G1-1 and a thumbnail image group G1-2. The thumbnail image group G1-1 is similar to the thumbnail image group G1 described above in the embodiment. The thumbnail image group G1-2 is created using parameters different from those of the thumbnail image group G1-1. More specifically, the thumbnail image group G1-1 displays plural thumbnail images arranged in the horizontal direction. On the other hand, the thumbnail image group G1-2 displays plural thumbnail images arranged in the vertical direction. At both ends of the thumbnail image group G1-1 in the horizontal direction thereof, images BE indicative of the end sections of the thumbnail image group G1-1 are displayed. In the example of FIG. 38, the images BE are images that simulate bookends. In other words, the thumbnail image group G1-1 simulates books that are arranged side by side between the two bookends, and the thumbnail image group G1-2 simulates books that are stacked on top of the other outside the two bookends. The thumbnail image group G1-1 displays opened facing pages described above in the embodiment, but the thumbnail image group G1-2 does not display opened facing pages.

3-2. Modified Example 2

In the modified example 1, the thumbnail image group G1-2 may be modified according to their conditions, in accordance with a modified example 2. For example, the order of arrangement of thumbnail images may be modified according to the frequency of selection of thumbnail images (the use frequency of the thumbnail images). More specifically, the order of arrangement may be changed such that those of the thumbnail images used in higher frequency are positioned upper in the stack. In another example, the sizes of thumbnail images may be changed such that those of the thumbnail images used in higher frequency have greater sizes. In accordance with still another example, the colors of thumbnail images may be varied according to the frequency of use in order to improve the distinguishability between thumbnail images used in higher frequency and thumbnail images used in lower frequency.

3-3. Modified Example 3

In the modified example 1, thumbnail images belonging to the thumbnail image group G1-1 and thumbnail images belonging to the thumbnail image group G1-2 may be modified according to their conditions, in accordance with a modified example 3. For example, a thumbnail image used in the lowest frequency in the thumbnail image group G1-1 may be replaced with a thumbnail image used in the highest frequency in the thumbnail image group G1-2. In accordance with another example, a thumbnail image belonging to the thumbnail image group G1-2 may be transferred to the thumbnail image group G1-1 in response to an instruction by the user.

3-4. Modified Example 4

The order of arrangement of thumbnail images in the thumbnail image groups may be modified according to their conditions. In the embodiment described above, the order of arrangement of thumbnail images is decided according to data exemplified in FIG. 9, and the order of arrangement of the thumbnail images is not changed unless the a specific instruction is given by the user. In accordance with a modified example 4, the order of thumbnail images is automatically changed without regard to instructions by the user. For example, a thumbnail image with a strong relevance with an application program assigned to a thumbnail image located at an opened facing page section may be moved next to the opened facing page section. In this case, the relevance of the application program with the thumbnail image may be defined by a setting file. The setting file is stored in the storage section 8, and the control section 3 may read the setting file from the storage section 8, judge its relevance, and modify the arrangement of the thumbnail image.

3-5. Modified Example 5

Figure 39:
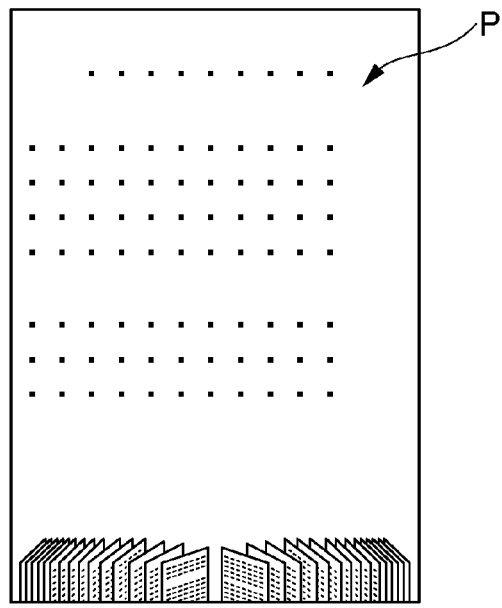
FIG. 39 is a view showing an example of a display image in accordance with a modified example 5.

FIG. 39 is a view showing an example of a display image in accordance with a modified example 5. Instead of displaying a thumbnail image group in its entirety, only a portion thereof may be displayed. In the example shown in FIG. 39, only a predetermined range from the upper end of a thumbnail image group, for example, only a top portion thereof is displayed, and a lower portion lower than the upper portion is not displayed.

3-6. Modified Example 6

Figure 40:
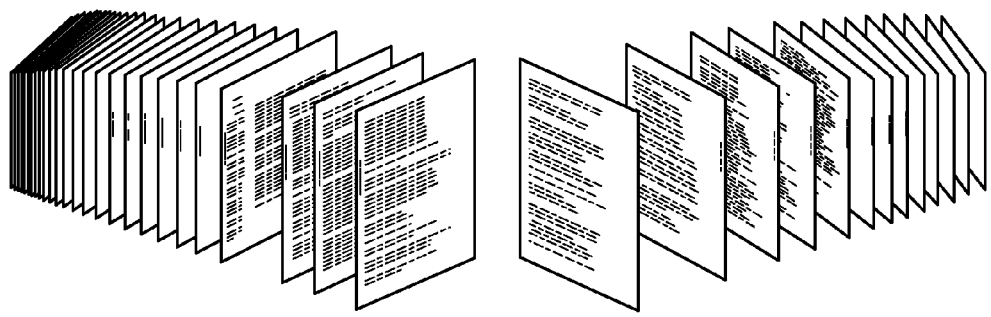
FIG. 40 is a view showing an example of arrangement of thumbnail images in accordance with a modified example 6.

FIG. 40 is a view showing an example of the arrangement of thumbnail images in accordance with a modified example 6. The arrangement of thumbnail images in a thumbnail image group is not limited to the one described in the embodiment above. Thumbnail images may be arranged from the right to the left of a display region in a descending order of their page numbers. Also, the positions of upper or lower sides of adjacent two thumbnail images may not have to match each other. In the example shown in FIG. 40, thumbnail images displayed on the left side of a thumbnail image of the selected page are shifted gradually upward as they are placed farther away from the selected page. Thumbnail images displayed on the right side of a thumbnail image corresponding to one page prior to the selected page are shifted gradually upward as they are placed farther away from the thumbnail image corresponding to one page prior to the selected page.

3-7. Modified Example 8

The size of a thumbnail image is not limited to those described in the embodiments. The size of a thumbnail image may be decided in advance. In another example, the size of a thumbnail image may be changed according to an instruction inputted by the user. In accordance with still another example, the size of a thumbnail image may be changed according to the resolution of the display section 1. This configuration is effective for a device with its display device being exchangeable, for example, in a case where the electronic apparatus 1000 is a personal computer or the like. Also, the size of thumbnail images may not have to be the same for all of the pages. More specifically, the thumbnail image of a selected page may be made larger than thumbnail images of pages other than the selected page. Also, the thumbnail image of a second selected page may be made larger than thumbnail images of pages before or after the second selected page. In another example, the thumbnail image of the selected page may be the largest, and thumbnail images of other pages may be made gradually smaller as the pages are located farther away from the selected page. In accordance with still another example, thumbnail images of pages in a predetermined range from the selected page may have the same size as that of the selected page, and thumbnail images of pages outside of the range may be made smaller than the thumbnail image of the selected page.

3-8. Modified Example 8

Parameters set for generating a thumbnail image group are not limited to those described in the embodiment. Conditions, such as, the angle of rotation θ, the interval d, overlapping conditions, and the like are not limited to those described in the embodiment, and other conditions may be used. Also, parameters other than those described above in the embodiment, such as, the display position in the vertical direction, the size of thumbnail images, the display color and the like may be used.

The embodiment is described above, using an example of selecting a single thumbnail image among a plurality of thumbnail images included in a thumbnail image group. However, two or more thumbnail images may be selected from among a single thumbnail image group. In other words, the single thumbnail image group may have plural opened facing page sections. In another example, thumbnail images may be given priority in selection, and parameters may be changed according to the priority. For example, the angle of rotation θ and the interval d may be changed such that a thumbnail image selected in the first priority is positioned at an opened facing page section, and the display position is changed such that a thumbnail image selected in the second priority pops out upwardly of the display region.

3-9. Modified Example 9

Deformation of thumbnail images is not limited to the embodiment described above. For example, the angle of rotation θ may be constant irrespective of a selected page. Also, the angle of depression φ may be zero (thereby giving no bird's-eye view), or may be in a negative value (thereby looking up from below).

3-10. Modified Example 10

Figure 41:
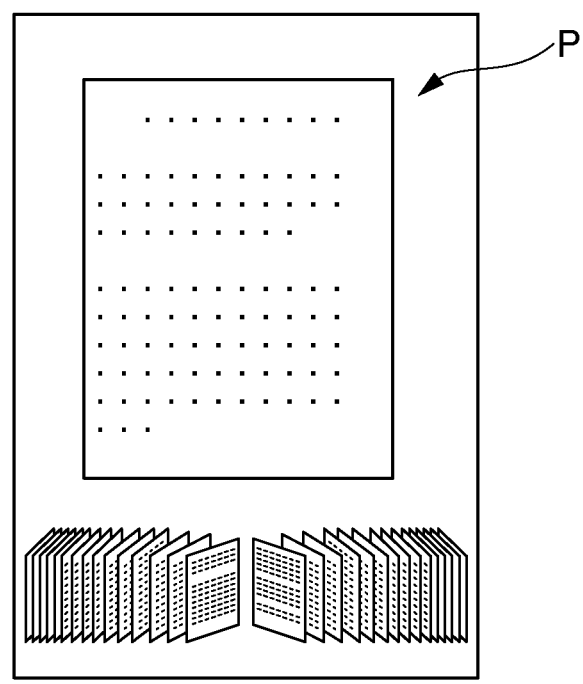
FIG. 41 is a view showing an example of arrangement of thumbnail images in accordance with a modified example 10.

FIG. 41 is a view showing an example of a thumbnail image group in accordance with a modified example 10. The positional relation between the thumbnail image group and the first selected page is not limited to the relation described in the embodiment. FIG. 41 shows an example in which a thumbnail image group and a selected page are displayed in a manner not to overlap each other. In another example, a thumbnail image group P11 alone may be displayed without displaying a first selected image P. When a thumbnail image group P11 alone is displayed, the size of each of the thumbnail images may be made larger, compared to the case where the thumbnail image group is displayed together with the first selected page P.

3-11. Modified Example 11

The electronic apparatus 1000 may have a configuration that is capable of switching between display and non-display of thumbnail images. Switching between display and non-display may be performed, for example, according to an input instruction through the operation section 9. More specifically, when the button 9B is depressed, thumbnail images being displayed may be erased. When the button 9A is depressed in the state where no thumbnail image is displayed, thumbnail images may be displayed. For erasing thumbnail images, the thumbnail images may be scrolled down below the display region. For displaying thumbnail images, the thumbnail images may be scrolled upward from below the lower edge of the display region.

3-12. Modification Example 12

The configuration of the operation section 9 is not limited to the configuration described in the embodiment. The operation section 9 may be provided with a position input device that obtains information of a position on the display section 1 which is touched by a stylus pen. The electronic apparatus 1000 may obtain the position and locus of the stylus pen based on the positional information obtained by the position input device, and each of the sections of the electronic apparatus 1000 may be controlled according to the position and locus obtained.

3-13. Other Modified Examples

The electronic apparatus 1000 is not limited to an electronic book reader. The electronic apparatus 1000 may be a personal computer, a PDA (Personal Digital Assistant), a cellular phone, a smart phone, a tablet terminal, or a portable game console. In these electronic apparatuses, the functions shown in FIG. 6 may be realized through execution of a program by the control section 3. The program may be provided in a state being stored in computer-readable recording media, such as, magnetic recording media (for example, a magnetic tape, a magnetic disk (HDD (Hard Disk Drive), a FD (Flexible Disk) or the like), optical recording media (an optical disk (CD (Compact Disc), a DVD (Digital Versatile Disk) or the like), magneto-optic recording media, and semiconductor memories. In another example, the program may be downloaded onto the electronic apparatus 1000 through a communication line. The obtained program may be installed in and used by the electronic apparatus 1000.

The equivalent circuit of pixels is not limited to the equivalent circuit described in the embodiment. Switching elements and capacitance elements may be combined in any way, as long as a controlled voltage can be applied between the pixel electrodes 13a and the transparent electrode 32. Also, the method of driving the pixels is not limited to the bipolar drive method descried in the embodiment. A single polar drive method in which voltages with a single polarity are applied to pixels in each single frame may be performed.

The structure of pixels is not limited to the structure described in the embodiment. For example, the polarities of charged particles are not limited to the polarities described in the embodiment. Black electrophoretic particles may be negatively charged, and white electrophoretic particles may be positively charged. In this case, the polarities of voltages to be applied to the pixels become inversed to the polarities described in the embodiment. Also, the display elements are not limited to electrophoretic type display devices using microcapsules. Other display elements, such as, liquid crystal elements, organic EL (Electro Luminescence) elements or the like may be used. In the embodiment, the display section 1 has the display function of displaying monochrome two gray levels, but may be provided with a display function of displaying monochrome three or more gray levels, or a color display function.

A part of the functions of the electronic apparatus 1000 shown in FIG. 6, or a part of the processings described with the flow chart of FIG. 8 may be omitted. For example, in the embodiment, an example in which the control section 3 generates thumbnail images from book data. However, the control section 3 may not have to generate thumbnail images. In this case, for example, book data may include thumbnail images. The control section 3 may obtain thumbnail images from the book data.

An image to be displayed on the display section 1 is not limited to an image of an electronic book. An image to be displayed on the display section 1 may be a thesis, a report, a document, a figure, a table, a photo, a web site, or the like.

The entire disclosure of Japanese Patent Application No. 2011-107428, filed May 12, 2011 is expressly incorporated by reference herein.

What is claimed is:

1. A display apparatus comprising:
    a display device that displays a plurality of images in a first row, an operation of an application program being assigned to each of the images;
    a rearrangement device that rearranges the plurality of images, when a portion of the first row is specified, such that the specified portion is at an opened facing page section;
    an execution device that executes the operation of the application program corresponding to an image located at the opened facing page section when the opened facing page section is specified; and
    a display control device that controls the display device, when the operation is executed by the execution device, to perform a display according to the operation executed, wherein the operation of the application program includes newly displaying a plurality of images, each being assigned with an operation of an application program, in a second row different from the first row, wherein the second row is displayed without deleting the first row in the display device, and the second row being displayed as a hierarchical sub-level of the first row, and wherein the second row is aligned so as to extend in the same direction as the first row, wherein the second row does not overlap the first row in the display.

2. A display apparatus according to claim 1, wherein, when a portion among the second row is specified, the display control device displays a plurality of images, each of the images being assigned with an operation of an application program, in a third row in a predetermined direction with respect to the first row as viewed from the second row.

3. A display apparatus according to claim 1, wherein
the display device includes a plurality of pixels,
the gray level of the plurality of pixels is changed by a write operation of applying a voltage to each of the pixels a plurality of times,
the display control device compares image data indicative of an image to be newly displayed at the display device with scheduled image data indicative of an image scheduled to be displayed at the display device by the write operation in progress, thereby judging as to which pixels among the plurality of pixels are to change the gray level,
when pixels that are judged to be those of the pixels whose gray level is to be changed are not in the write operation, the display control device starts the write operation on the pixels to have a gray level specified by the image data, and
when pixels that are judged to be those of the pixels whose gray level is to be changed are in the write operation, the display control device starts the write operation on the pixels to have a gray level specified by the image data upon completion of the write operation in progress.

4. An electronic apparatus comprising the display apparatus recited in claim 1.

5. The display apparatus according to claim 1, wherein the operation of the application program comprises a search program associated with a thumbnail image and when the search program is executed, the plurality of images of the second row which are displayed upon operation of the search program comprise thumbnail images showing search results found by using a certain search term which are displayed as a row of thumbnail images in the next hierarchical level.

6. A display apparatus according to claim 1, wherein the entire first row is visible while the second row is displayed.

7. A display apparatus according to claim 1, wherein an interval between images of the plurality of images decreases as the images are placed further from the opened facing page section.

8. A display apparatus according to claim 1, wherein each of the plurality of images are displayed having a side which is shifted with respect to another side so as to form a parallelogram rotated about a virtual axis.

9. A display control method comprising the steps of:
displaying a plurality of images, each of the images being assigned with an operation of an application program, in a first row at a display device;
rearranging the plurality of images, when a portion of the first row is specified, such that the specified portion is at an opened facing page section;
executing the operation of the application program corresponding to an image located at the opened facing page section when the opened facing page section is specified; and
controlling the display device, when the operation is executed, to perform a display according to the operation executed,
wherein the operation of the application program includes newly displaying a plurality of images, each being assigned with an operation of an application program, in a second row different from the first row, wherein the second row is displayed without deleting the first row in the display device, and the second row being displayed as a hierarchical sub-level of the first row, wherein the second row is aligned so as to extend in the same direction as the first row,
wherein the second row does not overlap the first row in the display.

* * * * *